United States Patent [19]
Kondo

[11] Patent Number: 5,471,242
[45] Date of Patent: Nov. 28, 1995

[54] STILL IMAGE PICKUP APPARATUS WITH SHORTENED EXPOSURE TIME

[75] Inventor: Makoto Kondo, Kanagawa, Japan

[73] Assignee: Canon Kabushiki Kaisha, Tokyo, Japan

[21] Appl. No.: 26,991

[22] Filed: Mar. 5, 1993

[30] Foreign Application Priority Data

Mar. 10, 1992 [JP] Japan ..................... 4-051710

[51] Int. Cl.⁶ ................................... H04N 5/238
[52] U.S. Cl. ..................... 348/224; 348/221; 348/296; 348/362
[58] Field of Search ............... 358/213.24, 228, 358/213.11, 213.15, 213.19; 315/200 A; 354/413, 416; 348/296, 221, 230, 371, 297, 298, 299, 362; H04N 5/238

[56] References Cited

U.S. PATENT DOCUMENTS

| | | | |
|---|---|---|---|
| 4,881,127 | 11/1989 | Isoguchi et al. ................. | 348/296 |
| 4,918,533 | 4/1990 | Date et al. ...................... | 348/230 |
| 4,998,127 | 3/1991 | Bell ................................ | 354/413 |
| 5,097,340 | 3/1992 | Tanabe et al. ................... | 348/371 |
| 5,140,426 | 8/1992 | Oda ................................ | 358/213.24 |

*Primary Examiner*—Joseph Mancuso
*Assistant Examiner*—Andrew B. Christensen
*Attorney, Agent, or Firm*—Robin, Blecker, Daley & Driscoll

[57] ABSTRACT

In a still image pickup apparatus of the kind arranged to start an exposure by causing an image sensor to begin an accumulating action and to end the exposure by using a light-shielding member having a poor responsivity, the exposure time is arranged to be controlled by allowing the accumulating action of the image sensor to begin after the light-shielding member starts the light-shielding action for terminating the exposure time. This arrangement enables the apparatus to perform a high-speed shutter operation irrespectively of the responsivity of the light-shielding member.

13 Claims, 21 Drawing Sheets

FIELD SHOOTING IN EF MODE (FILL-IN FLASH)

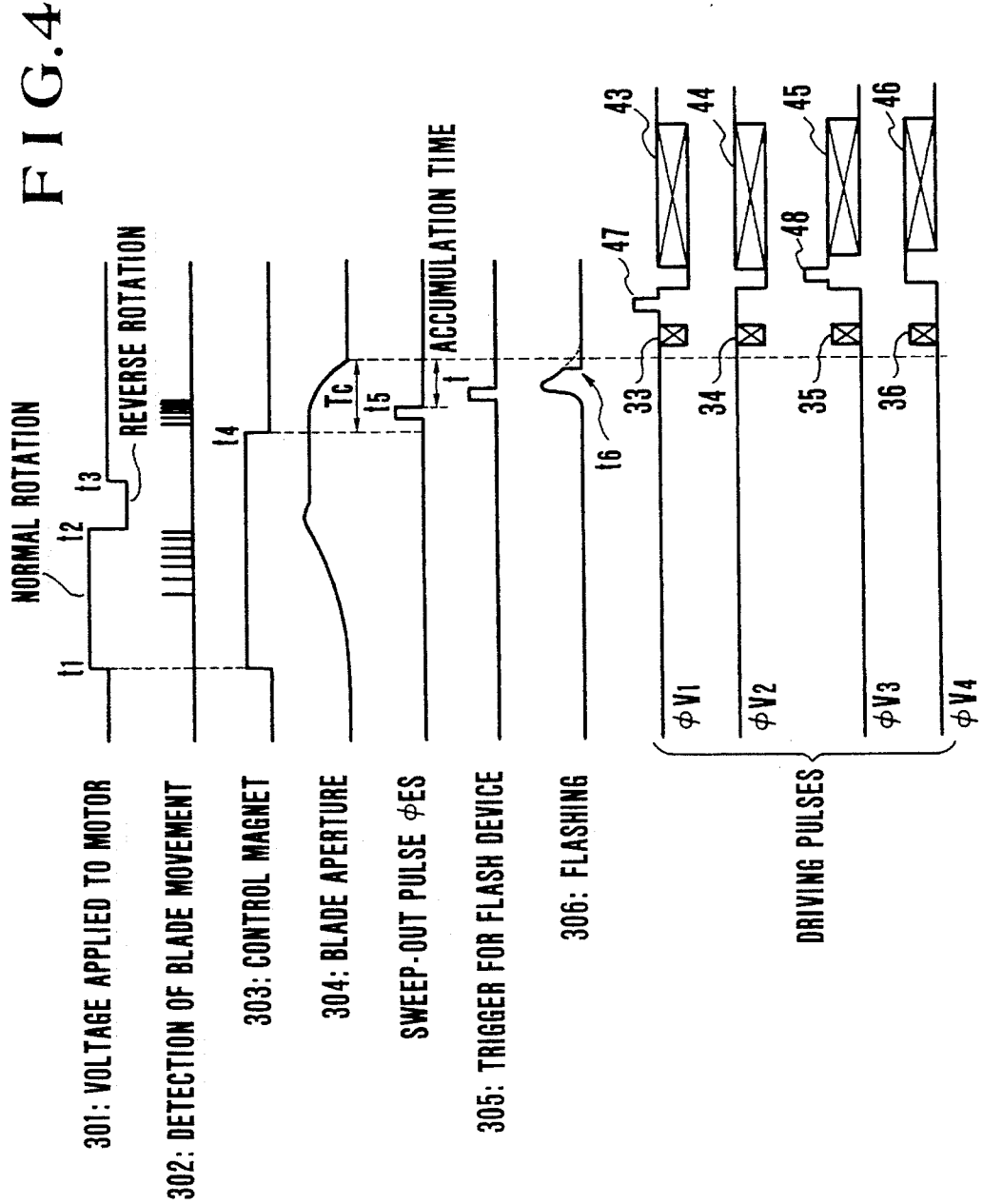

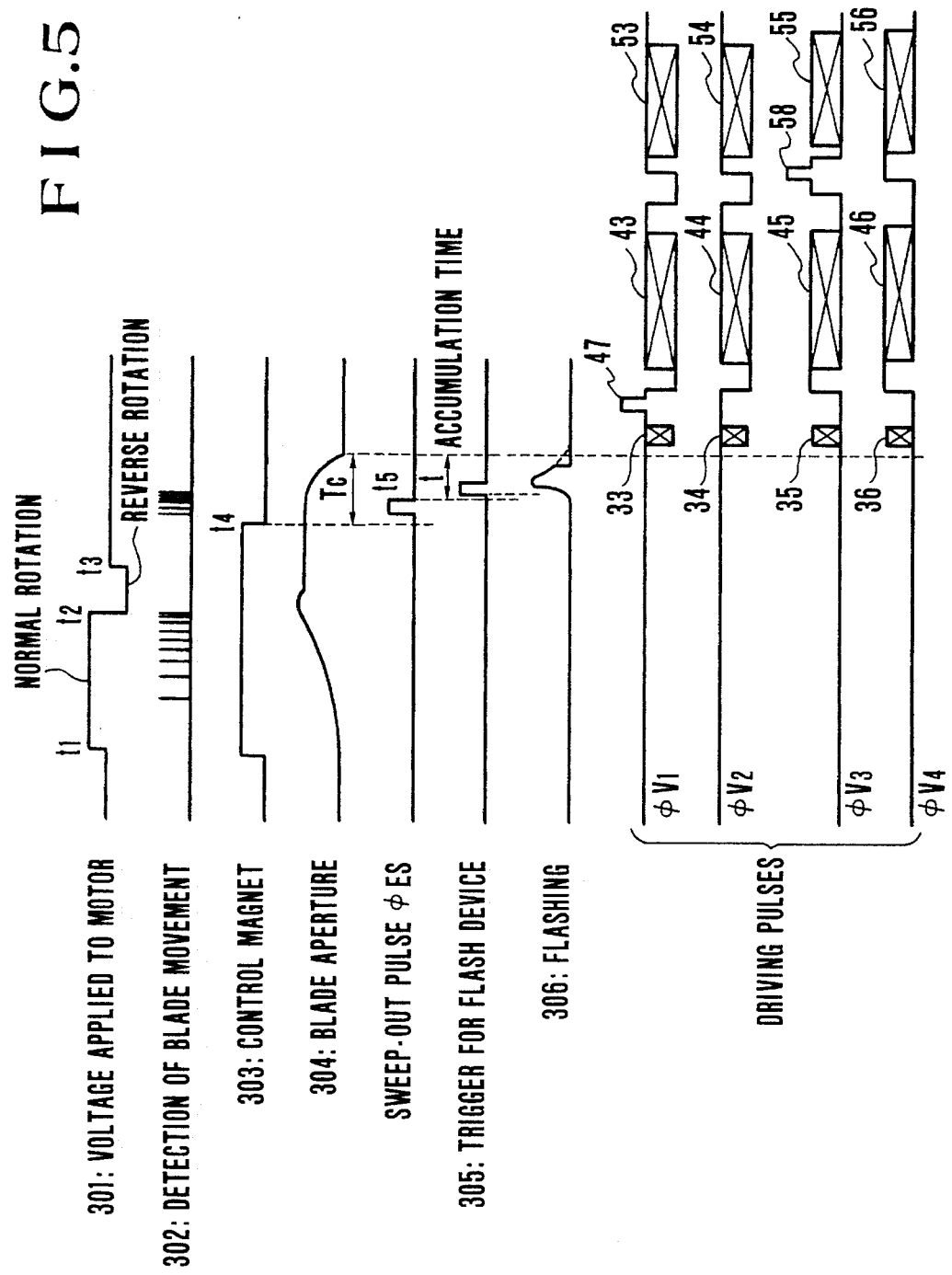

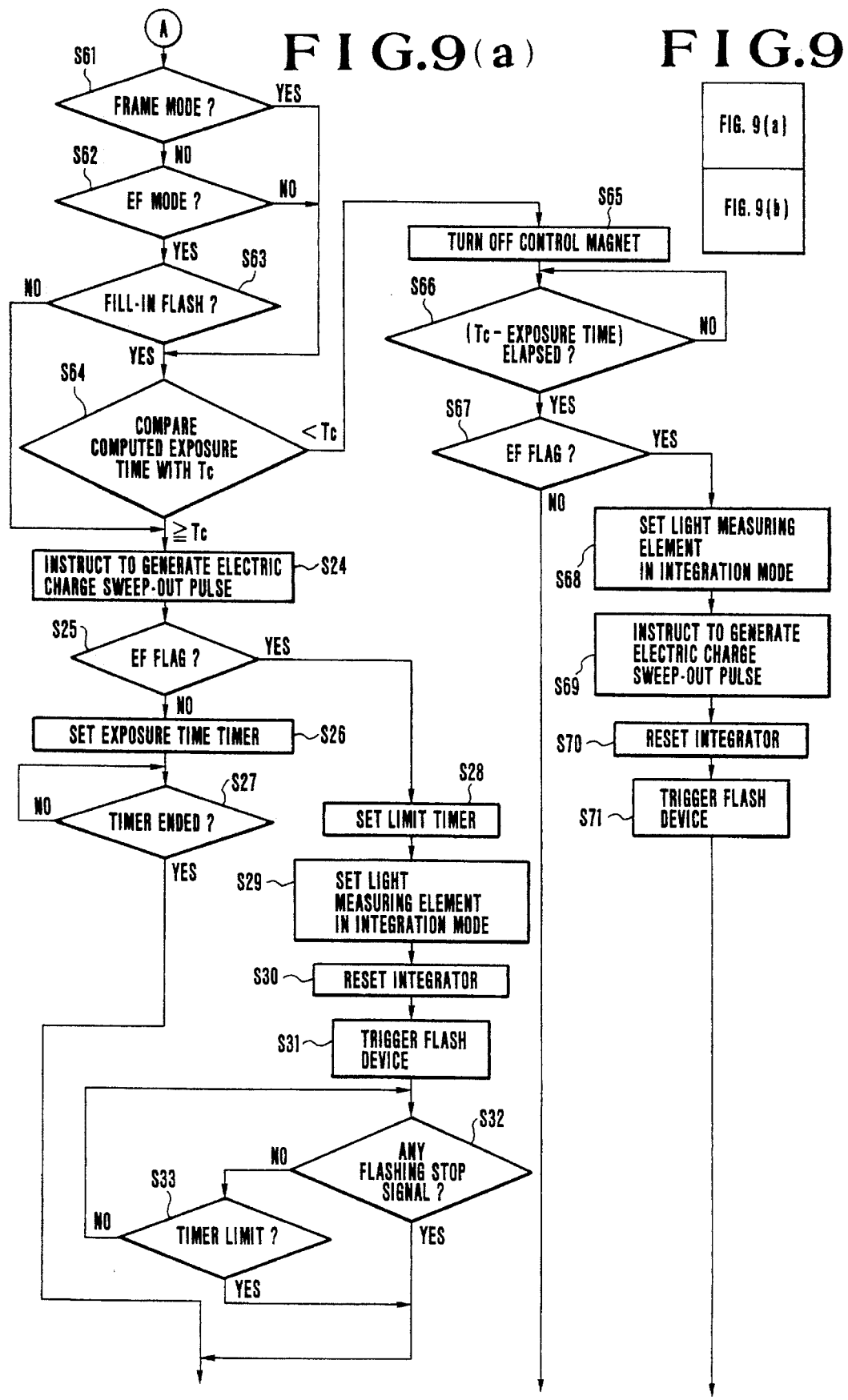

t = 0 : START POINT OF TIME OF SHUTTER ACTION (t4 IN FIGS. 4 TO 7)

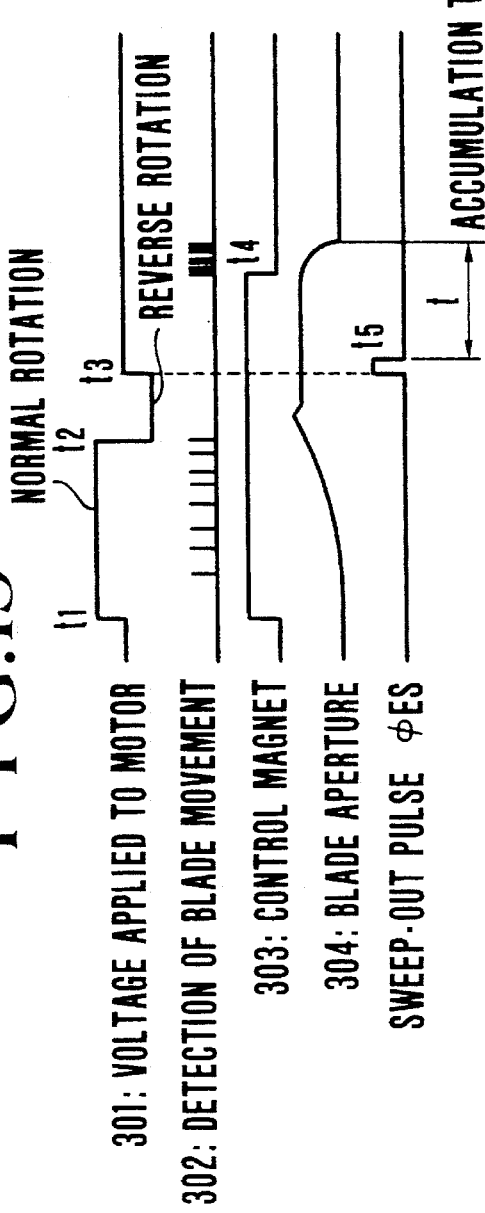
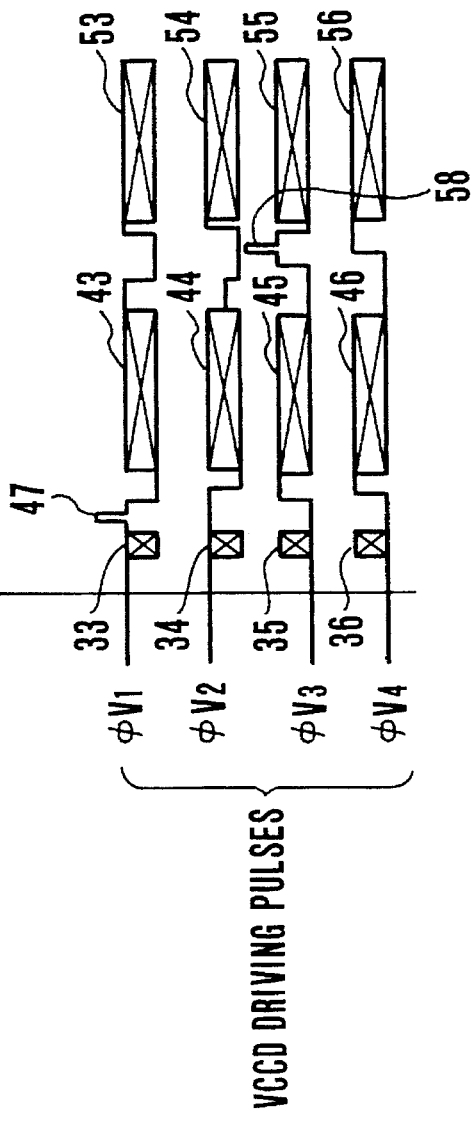
FIG. 19

STILL IMAGE PICKUP APPARATUS WITH SHORTENED EXPOSURE TIME

BACKGROUND OF THE INVENTION

1. Field of the Invention

This invention relates to a still image pickup apparatus and more particularly to a still image pickup apparatus of the type arranged to use both the removal of electric charges from an image sensor and a mechanical light-shielding means for controlling exposure time.

2. Description of the Related Art

In the field of still video cameras which have recently become saliently popular, a length of time for which an image sensor is to be illuminated with an optical image of an object is generally controlled by means of a mechanical shutter. This arrangement may be regarded as simply replacing a film used for a silver-halide camera with the image sensor. The aperture of the lens stop of the still video camera is controlled by means of an iris (diaphragm) which is disposed within the lens.

In another example of the still video cameras, a turret stop is used for the aperture control while a mechanical shutter is used for the exposure time control. Further, some of the cameras of this kind is arranged to control the exposure time (accumulation time) by means of an electronic shutter, leaving the mechanical shutter in a full open state, in the event of continuously taking a series of shots at a high speed.

However, the image sensor of the still image pickup apparatus such as the still video camera mentioned above gives a narrower latitude than the camera of the kind using a silver halide film. Accurate control over the aperture and the exposure time is not easy and thus calls for an expensive arrangement, which results in an increase in cost.

This problem in respect to the cost increase may be mitigated by arranging the aperture to be variable stepwise instead of continuous. However, this arrangement still presents a problem, because the camera must be equipped both with the shutter and the iris. Besides, the shutter control accuracy attainable by this arrangement is insufficient.

Further, the cost increase problem may seem to be mitigable also by lessening the number of parts by arranging one set of blades to be used both as an iris and as a shutter. However, that solution still presents a problem in respect to an operation characteristic, because: In order to ensure accurate control over an aperture defined by the blades, these blades must be operated at a low speed, which makes it hardly possible to use them as a high-speed shutter.

This shortcoming not only makes a high-speed shutter hardly obtainable but also narrowly restricts an object luminance range within which a flash device is usable for the so-called fill-in flash shooting for preventing, with the light of the flash device, an object having a high luminance background from giving a darkly blank image. The shortcoming thus prevents a back-light shot from being adequately corrected.

Further, in cases where a motor is used for driving the blades, the aperture is stabilized by bringing the blades to a stop either by cutting off power supply to the blade opening motor or by reversely energizing the motor. The speed of the blades varies according to a voltage applied to the motor. Therefore, in bringing the blades to a stop at an aperture position, an error which takes place before the blades actually come to a stop fluctuates for the same aperture position. Fluctuations in voltage of the power supply thus make the aperture of the iris unstable. To avoid the instability, it is necessary either to calculate an apposite exposure time by measuring once again the light passing through the actual aperture after stabilization of the iris aperture or to stabilize the iris aperture by providing the camera with a means for stabilizing the voltage to be applied to the motor. Such arrangement results in a complex system.

U.S. patent application Ser. No. 767,512, filed on Sep. 30, 1991, has disclosed an image pickup device which solves the above-stated problem. The image pickup device comprises image pickup means arranged to be capable of clearing and reading image information for controlling accumulation time and having a first reading mode in which the information is read out once from effective picture elements and a second reading mode in which the information is read out divisionally from effective picture elements by carrying out the reading action a plurality of times, and optical light-shielding means. The accumulation time of the image pickup means is set through the image information clearing action of the image pickup means and the light-shielding action of the optical light-shielding means when the image pickup means is operating in the second reading mode, so that exposure control can be accurately accomplished in a still video camera or the like without any complex arrangement.

According to the image pickup device disclosed, the light-shielding action of the optical, or mechanical, light-shielding means begins after the photoelectron removing action of the image sensor. However, a length of time required for the light-shielding action of the mechanical light-shielding means from the start to the end of the light-shielding action is such a length that is hardly ignorable for the exposure time. Therefore, the exposure time cannot be shortened to a length less than the time necessary for the action of the mechanical light-shielding means. Hence, an over-exposure tends to occur in taking a shot of a high luminance object. In taking a shot of a fast moving object, a still image is hardly obtainable and the shot results in a blurred image.

SUMMARY OF THE INVENTION

It is an object of this invention to provide a still image pickup apparatus which solves the problems of the prior art described in the foregoing.

In accordance with this invention, a still image pickup apparatus of the kind starting an exposure by the electronic action of an image sensor and terminating the exposure by mechanical or physical light-shielding means which has a response time delay is arranged as follows: The exposure time of the image sensor is controlled by allowing the image sensor to begin an accumulating action after commencement of the light-shielding action of the light-shielding means for terminating the exposure time. This arrangement enables the embodiment to set the exposure time at a length of time shorter than a length of time necessary for the light-shielding action of the light-shielding means. Therefore, the apparatus can be arranged to have a high-speed shutter without arranging the light-shielding means to carry out the light-shielding action at a higher speed.

Another advantage of the image pickup apparatus which is the embodiment of this invention lies in that, with the accumulating action of the image sensor arranged to begin after commencement of the light-shielding action of the light-shielding means, a high-speed shutter can be obtained independently of the operating speed of the light-shielding means while preventing any smear resulting from reading information out of the image sensor after commencement of the light-shielding action of the light-shielding means. The object luminance range within which an image pickup action is possible thus can be broadened.

A further advantage of the embodiment lies in that, since the light-shielding means does not have to be arranged to operate at a high speed in obtaining a high-speed shutter, the arrangement of the embodiment does not cause any increase in cost nor in power consumption.

The above and other objects and features of this invention will become apparent from the following detailed description of embodiments thereof taken in connection with the accompanying drawings.

BRIEF DESCRIPTION OF THE DRAWINGS

FIG. 4 is a timing chart showing a field shooting operation performed in an EF (electronic flash) mode when exposure time is shorter than time Tc.

FIG. 5 is a timing chart showing a frame shooting operation performed in the EF mode when the exposure time is shorter than the time Tc.

FIGS. 9(a) and 9(b), assembled as shown in FIG. 9, are flow charts showing the operation of the first embodiment of this invention.

FIG. 19 is a timing chart showing a frame shooting operation performed in a non-EF mode when the exposure time is longer than the time Tc.

DETAILED DESCRIPTION OF THE PREFERRED EMBODIMENTS

Figure 1:
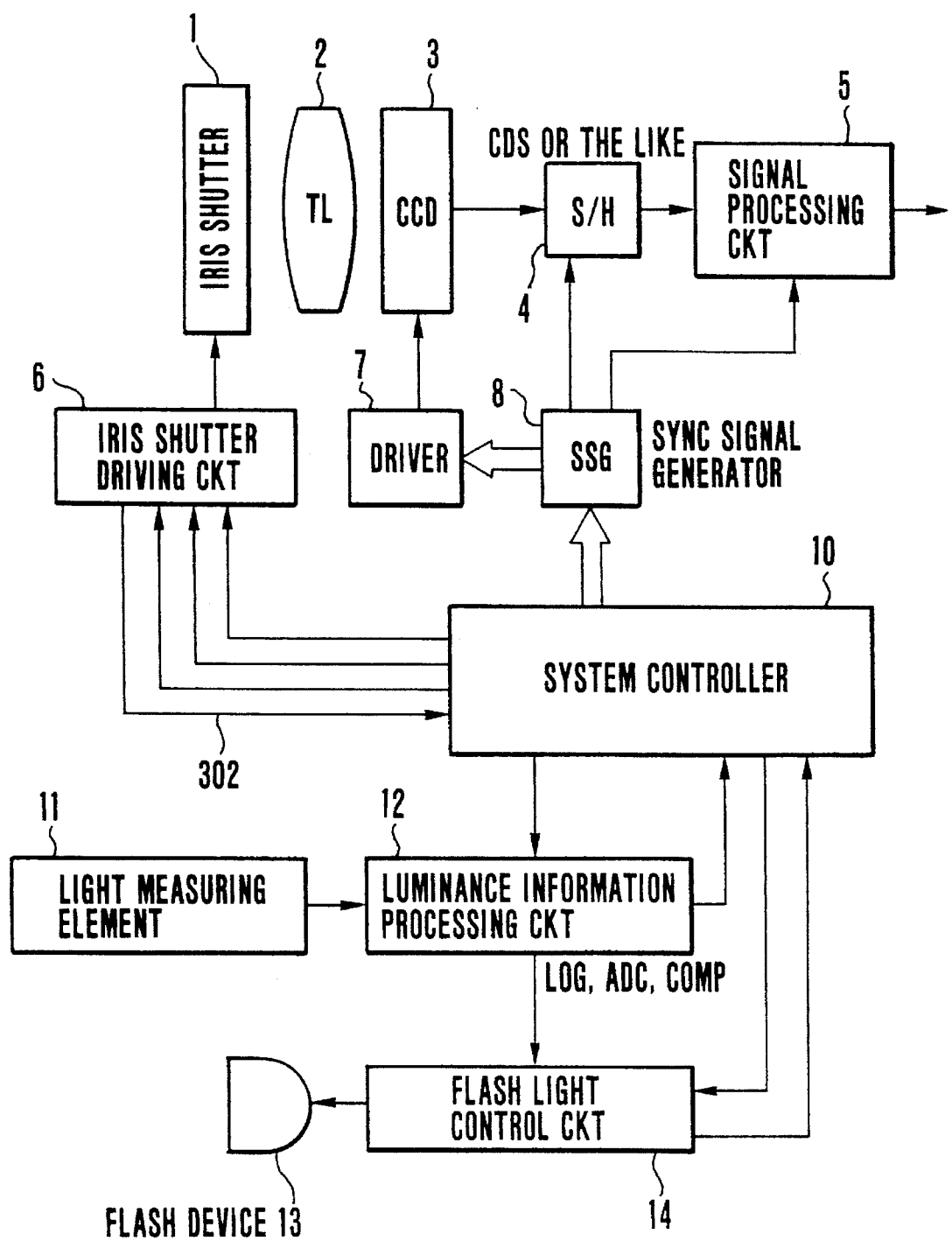
FIG. 1 is a block diagram showing the arrangement of a first embodiment of this invention.

The following describes the still image pickup apparatus of this invention through some of embodiments thereof with reference to the accompanying drawings:

FIG. 1 is a block diagram showing one embodiment of the still image pickup apparatus of this invention. Referring to FIG. 1, light-shielding means 1 such as a half-opening type shutter (an iris shutter) is arranged to serve not only as a shutter but also as an iris diaphragm for adjusting the quantity of incident light. According to this invention, the light-shielding means may be either a physical light-shielding means or a mechanical focal plane shutter or the like. Any light-shielding means is usable as long as there is a given amount of delay between the start and the end of its light-shielding action. The illustration includes a photo-taking lens 2, an image sensor 3 which is a CCD or the like and is arranged to convert into an electrical signal an optical image of a shooting object formed by the photo-taking lens 2, and a sample-and-hold circuit (hereinafter referred to as an S/H circuit) 4 which may be replaced with a CDS circuit. The S/H circuit 4 processes temporally discrete image signals photo-electrically converted by the image sensor 3 so as to make them into a continuous image signal. A signal processing circuit 5 is arranged to process the continuous image signal coming from the S/H circuit 4 for various purposes (for obtaining dynamic range linearity of gamma, knee, etc., digitizing, converting the signal of primary colors or complementary colors obtained from the image sensor into a luminance signal and color-difference signals, and so on). A driving circuit 6 is arranged to drive the half-opening type shutter 1 under the control of a system controller 10. A driving circuit 7 is arranged to drive the image sensor 3. A synchronizing signal generator 8 (hereinafter referred to as the SSG) is arranged to form clock pulses for driving and synchronizing the image sensor 3, the S/H circuit 4 and the signal processing circuit 5. The system controller 10 is composed of, for example, a microcomputer or the like and is arranged to control the whole still image pickup apparatus of this invention. A light measuring element 11 is arranged to measure the luminance of the object. A luminance information processing circuit 12 is arranged to perform logarithmic-compression and weight-attaching actions on the output of the light measuring element 11 and also to compare it with a given value for adjustment of the light of a flash device 13. The flash device 13 is arranged to supplementally illuminate the object. A control circuit (hereinafter referred to as a flash light control circuit) 14 is arranged to control the power supply, light emission and adjustment of light of the flash device 13.

FIG. 2 and FIGS. 3(a), 3(b) and 3(c) show the arrangement and the operation of the iris shutter. The iris shutter 1 shown in FIG. 1 is shown in detail in these drawings. Referring to these drawings, a base plate 101 serves as the structural arrangement base of the iris shutter. The base plate 101 is provided with an aperture 101a for passing light and shafts which are arranged to carry various work members and arranged in one unified body with the base plate 101. A motor 102 is arranged to serve as a drive source and to be normally or reversely rotatable. The motor 102 is provided with an output gear 102a which is attached to the rotation shaft of the motor 102 for transmitting a driving force. A charge member 103 has a gear part 103e to which a driving force is transmitted from the motor 102 via a gear train which is not shown. Two shafts on the base plate 101 are inserted into two slot parts 103a of the charge member 103 to carry it in such a way as to have it movable right and left as viewed in FIG. 2. The charge member 103 further has a protruding part 103d, a tapered face 103b and a protruding plane part 103c extending to a length which is equal to or longer than the length of each slot part 103a.

A control magnet 104 is of a sucking-repelling type. A magnet lever 105 is rotatably carried by a shaft part of the base plate 101. The magnet lever 105 includes an armature 105a which is arranged to come into tight contact with a sucking part 104a of the control magnet 104, a resilient charging part 105b which is formed in one body with the magnet lever 105, a magnet spring 105c which is arranged to cause the armature 105a to detach from the control magnet 104 when the control magnet 104 is deenergized and to have its urging force set to be weaker than the sucking state retaining force of the control magnet 104 obtainable when the control magnet 104 is energized, and an arm part 105d which is arranged to be capable of abutting on a projection 106b of a pawl member 106 and to cause the pawl member 106 to turn clockwise, as viewed in FIG. 2, against the force of a pawl member spring 106c by abutting on the projection 106b of the pawl member 106 when the control magnet 104 is deenergized.

A shutter blade driving member 107 is rotatably carried by a shaft part of the base plate 101. The shutter blade driving member 107 has a notch part 107a which is arranged to engage the claw part 106a of the pawl member 106 for setting the aperture value of an aperture formed jointly by shutter blades 110 and 111, projections 107b which are inserted in slots 110b and 111b formed in the shutter blades 110 and 111, and a gear part 107c.

A pulse gear 108 has a gear part 108a which engages the gear part 107c of the shutter blade driving member 107 and a pulse plate 108b which is provided with a pattern consisting of parts having different light transmission factors. The gear part 108a and the pulse plate 108b of the pulse gear 108 are formed in one body. A shutter spring 108c is arranged to urge the pulse gear 108 to move clockwise as viewed in FIG. 2 and to urge the shutter blade driving member 107 to move counterclockwise in such a way as to keep the shutter blades 110 and 111 in a closed state. A photo-interrupter 109 is arranged to detect the position of the shutter blades 110 and 111 by converting into an electronic signal any change of the pattern caused by the rotation of the pulse plate 108b.

Figure 2:
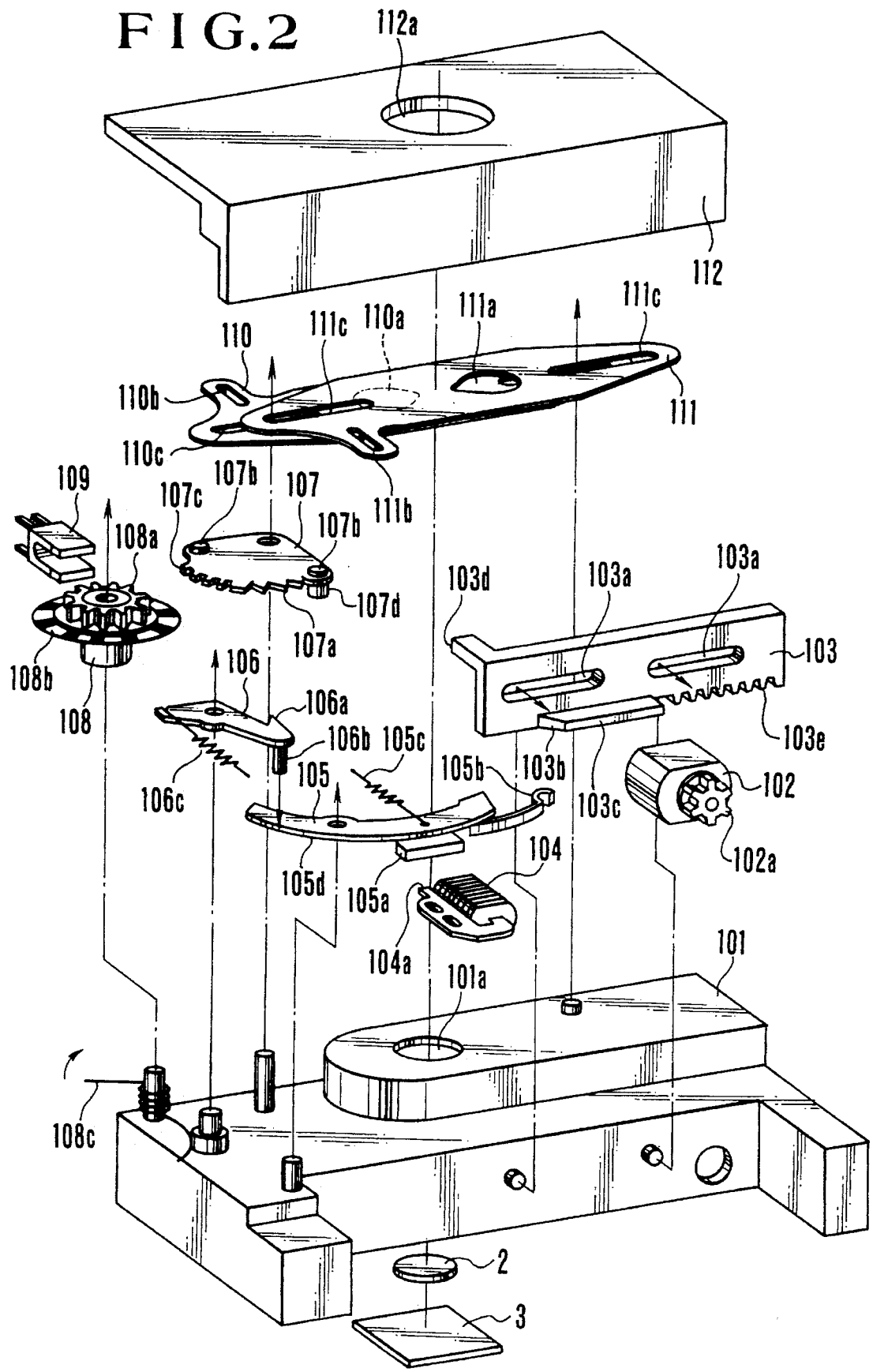
FIG. 2 is an oblique view showing a half-opening type shutter used for an image pickup apparatus which is arranged as the embodiment of this invention.

The shutter blades 110 and 111 are carried by two shafts provided on the base plate 101 and slots 110c and 111c in such a way as to be movable to the right or to the left as viewed in FIG. 2. The shutter blades 110 and 111 are provided with aperture parts 110a and 111a which are arranged to change the state of the aperture part 101a of the base plate 101 between a closed state and a full open state according to their mutual overlapping amount obtained with the shutter blades 110 and 111 oppositely moved by the shutter blade driving member 107.

A cover 112 has an aperture part 112a which is provided for passing light in the same manner as the aperture part 101a of the base plate 101. The cover 112 is arranged to keep all the members that form the iris shutter in their workable states on the base plate 101. A photo-taking lens 2 is provided for picking up an image. An image sensor 3 which is a CCD or the like is arranged to convert an image formed by the photo-taking lens 2 into an electrical signal for recording.

Figure 3A:
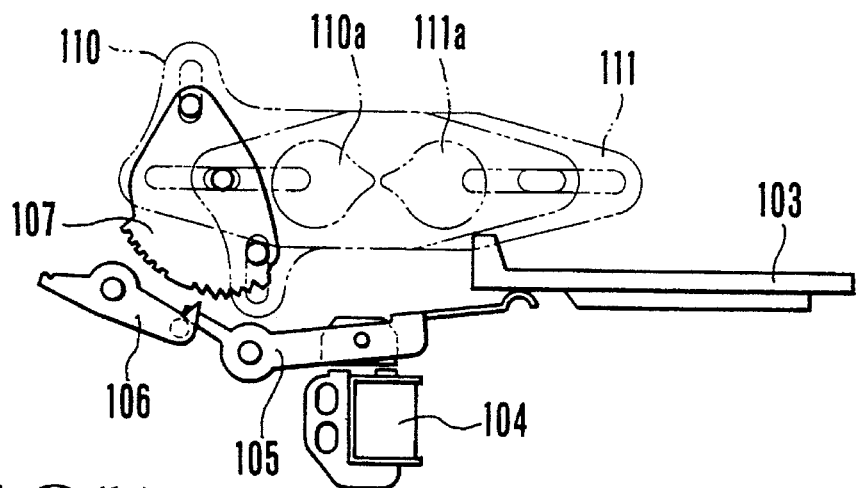
FIGS. 3(a), 3(b) and 3(c) illustrate the operation of the half-opening type shutter.
Figure 3B:
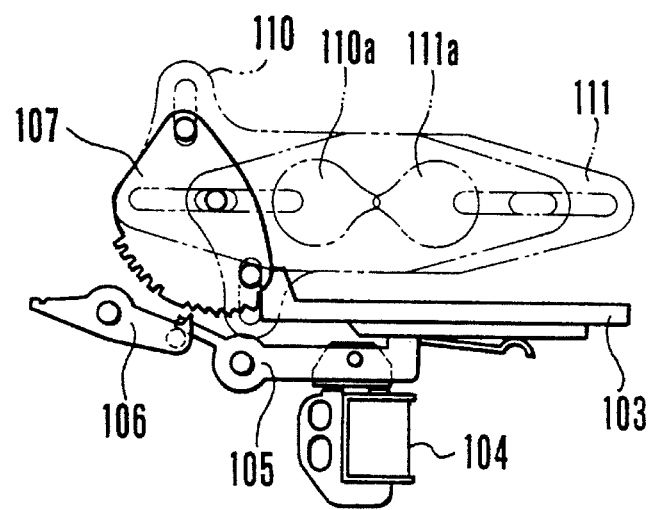
Figure 3C:
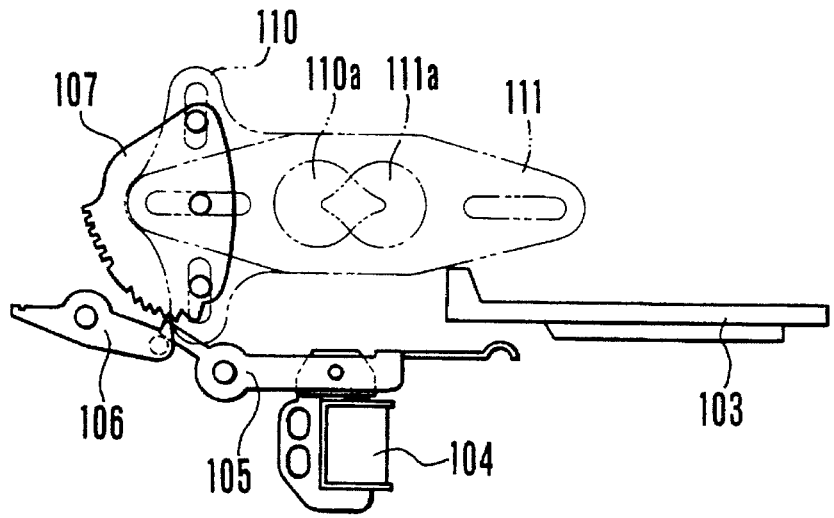

FIGS. 3(a), 3(b) and 3(c) illustrate the operating states of the iris shutter shown in FIG. 2. FIG. 3(a) shows the iris shutter as in its initial state. In this state, the aperture part 101a of the base plate 101 and the aperture part 112a of the cover 112 which are formed as shown in FIG. 2 are closed by the shutter blades 110 and 111. When the motor 102 is caused to normally rotate under this condition, the charge member 103 is moved via a gear train which is not shown to the left as viewed in the drawing. The control magnet 104 is then energized about the time of the movement of the charge member 103.

After that, the charge part 105b of the magnet lever 105 is pushed downward as viewed in the drawing by the tapered face 103b of the charge member 103. The armature 105a is thus pushed against the the sucking part 104a of the control magnet 104 against the force of the magnet spring 105c. The armature 105a is thus sucked by the magnet 104. The charge part 105b is arranged to be resilient for having the armature 105a pushed against the control magnet 104 without fail. Therefore, the height of the protrudent plane part 103c of the charge member 103 is arranged to permit overcharging.

When the charge member 103 moves further to the left, the protruding part 103d comes to abut on the abutting part 107d of the shutter blade driving member 107. The moving force of the charge member 103 then overcomes the urging force of the shutter spring 108c to cause the shutter blade driving member 107 to swing clockwise as viewed in the drawing. At the same time, the pulse gear 108 is caused to turn counterclockwise. The pulse gear 108 in turn causes the photo-interrupter 109 to generate a pulse signal. The shutter blade 110 then moves to the right and the other shutter blade 111 to the left. As a result, an aperture is formed jointly by the aperture parts 110a and 111a of the shutter blades 110 and 111.

The pawl member 106 then gradually changes its engaging point from one point over to another along the notch parts 107a of the shutter blade driving member 107. This state is as shown in FIG. 3(b). When the aperture thus formed opens, in this state, up to a size which is a little larger than a given aperture value calculated on the basis of the output of a light measuring device (parts 11 and 12 of FIG. 1), that is, when a time point at which the claw part 106a comes to override a predetermined notch of the notch part 107a is detected through the pulse signal of the photo-interrupter 109, the charge member 103 is brought back to its initial position by causing the motor 10 to reversely rotate. With the charge member 103 coming back to its initial position, the claw part 106a remains in the state of engaging the shutter blade driving member 107, so that the aperture can be set at the given aperture value. That state is as shown in FIG. 3(c).

After that, an apposite exposure is carried out by a combination of the electronic shutter of the image sensor which is a CCD or the like and the set aperture value. More specifically, the exposure is carried out as follows: In a field recording mode, the exposure is affected solely by the electronic shutter while the iris shutter of this invention functions only as a stop. Then, not only a single shot but also continuous shots can be easily taken by continuously operating the electronic shutter to record every one of the shots on a recording medium such as a floppy disc from the image sensor 3.

Upon completion of the exposure and shooting by means of the electronic shutter, the power supply to the control magnet 104 is cut off. The magnet lever 105 swings counterclockwise as viewed in the drawing. The arm part 105*d* pushes the claw part projection 106*b* to cause the pawl member 106 to swing clockwise. The claw part 106*a* is disengaged from the notch part 107*a*. This allows the shutter spring 108*c* to swing the shutter blade driving member 107 counterclockwise via the pulse gear 108. The shutter blades 110 and 111 are brought back to their initial state as shown in FIG. 3(*a*). The aperture part 112*a* is thus closed to terminate the exposure.

An electrical signal representing an image which is picked up and stored by the image sensor 3 is recorded on a recording medium which is a floppy disc or the like. With the signal recorded, a series of processes of the shooting operation comes to an end.

The operation of the above-stated still image pickup apparatus is described below with reference to FIGS. 4 to 7 which are timing charts and also to FIGS. 8 and 9(*a*), 9(*b*) which are flow charts.

Figure 6:
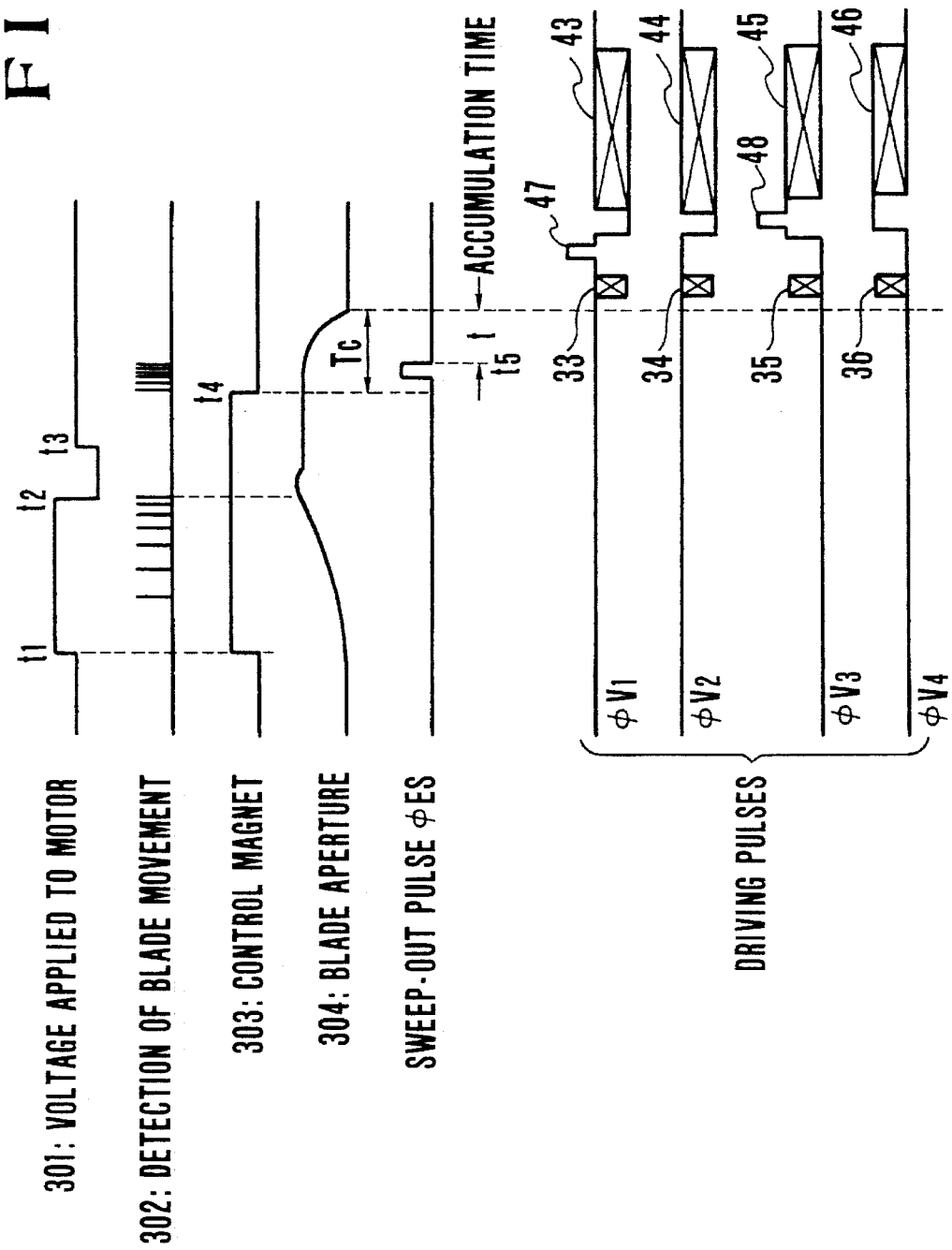
FIG. 6 is a timing chart showing a field shooting operation performed in a non-EF mode when the exposure time is shorter than the time Tc.
Figure 7:
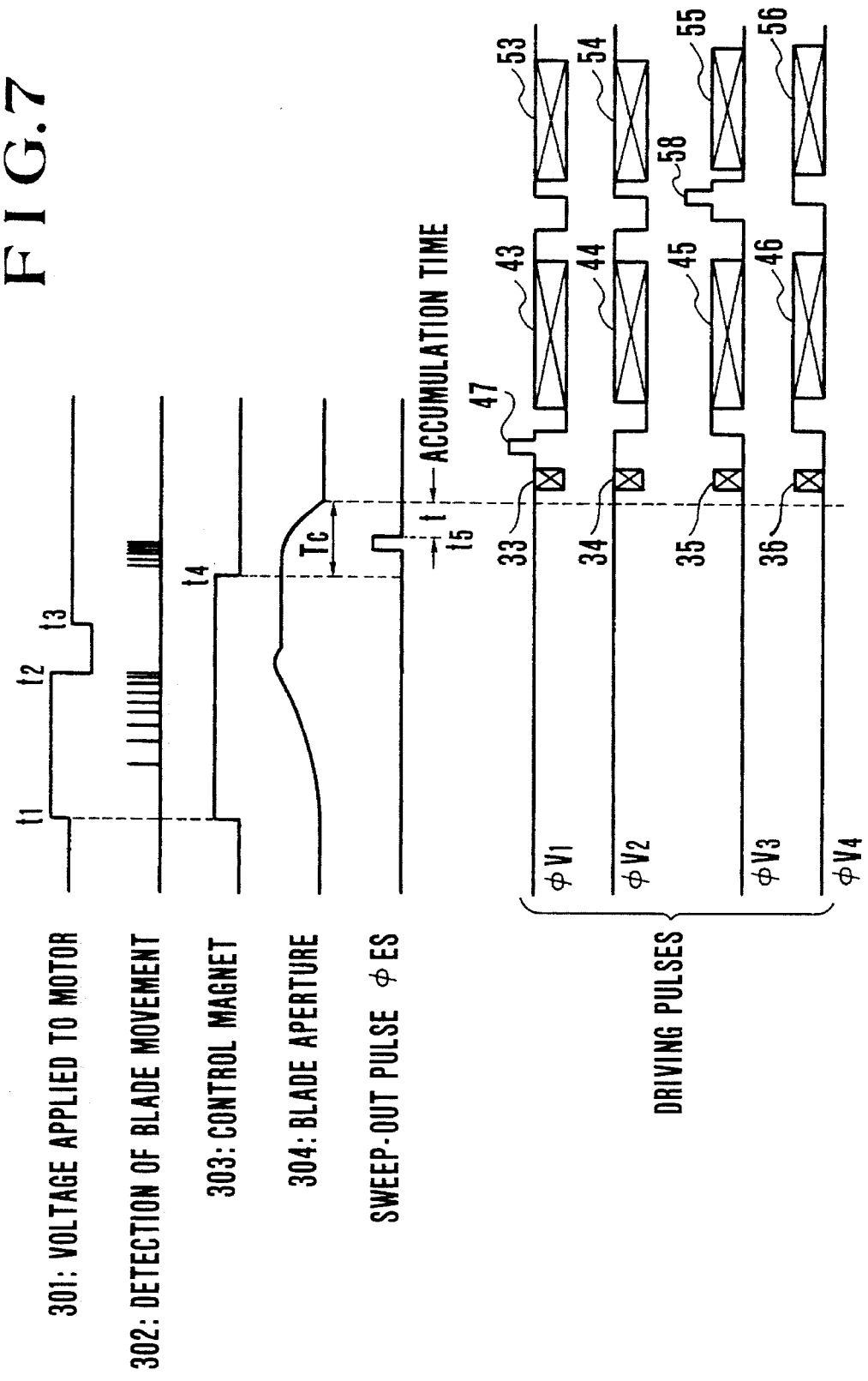
FIG. 7 is a timing chart showing a frame shooting operation performed in a non-EF mode when the exposure time is shorter than the time Tc.
Figure 8:
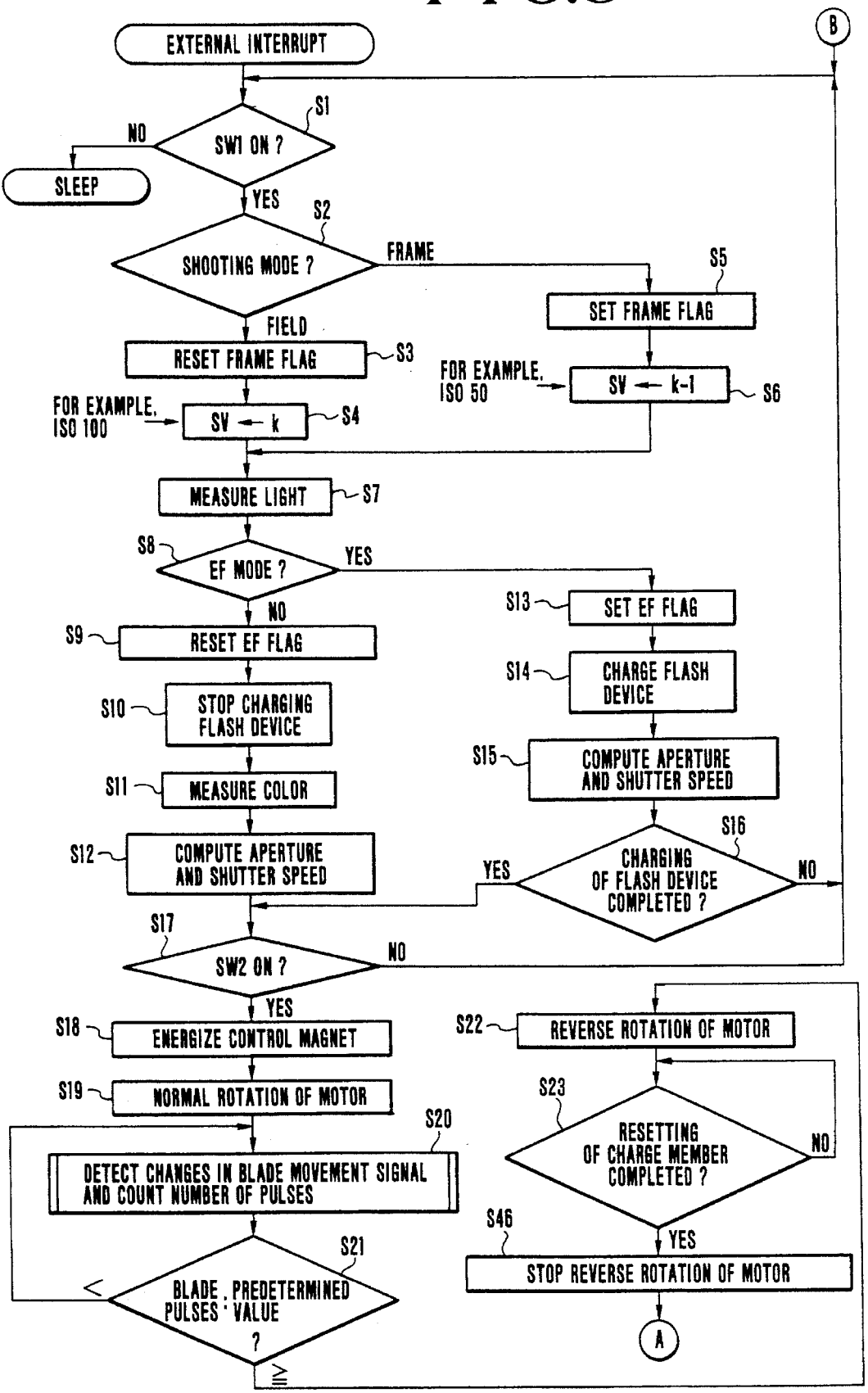
FIG. 8 is a flow chart showing the operation of the first embodiment of this invention.
Figure 9B:
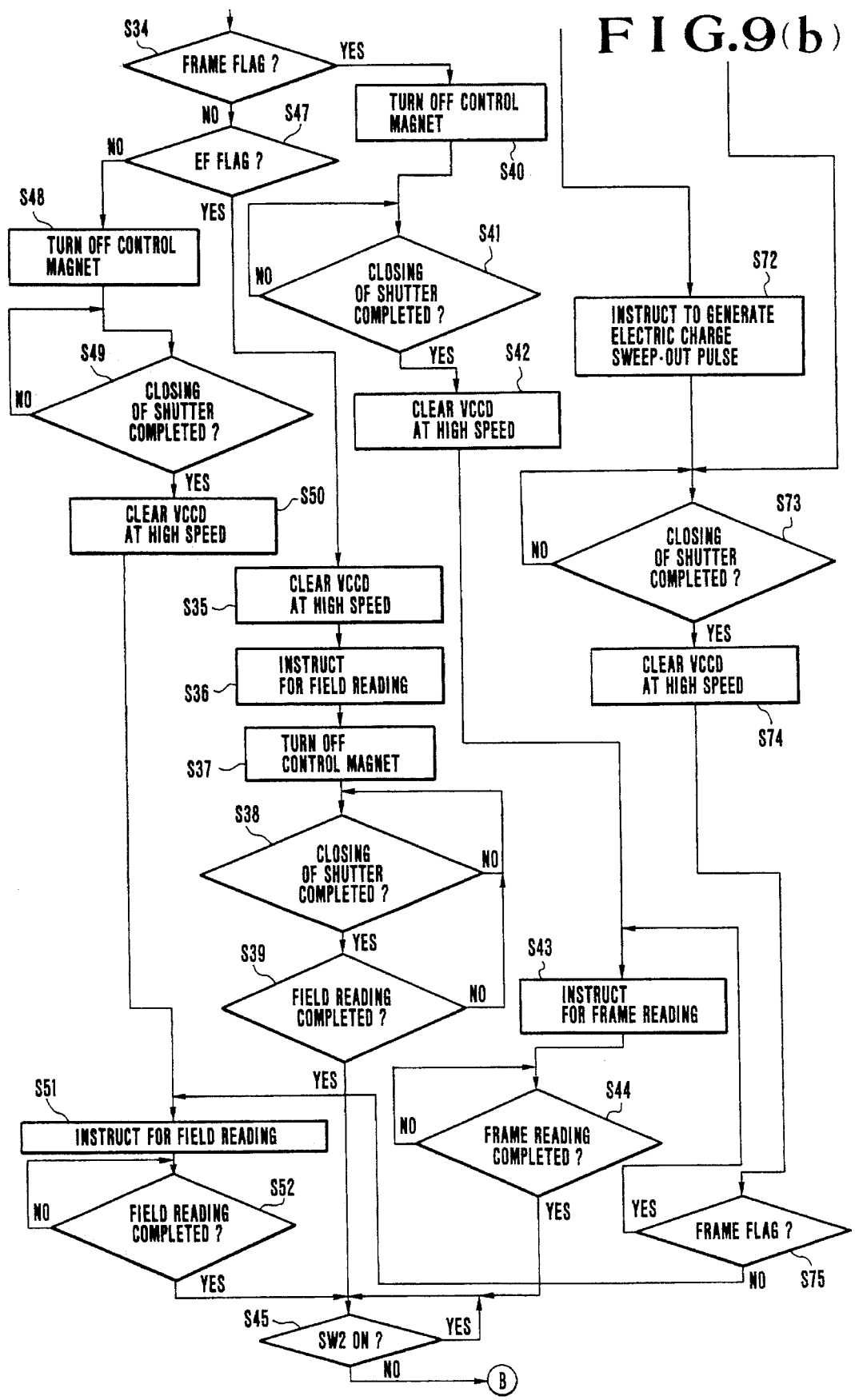

FIG. 4 is a timing chart showing a field shooting operation which FIGS. 8 and 9(*a*), 9(*b*) also show in part. In this case, field shooting is performed in the EF mode and the luminance of the shooting object is relatively high, thus requiring use of a flash device in the so-called fill-in flash mode. In other words, the exposure time is shorter than the time Tc necessary for closing the iris shutter 1 in this case. FIG. 5 is a timing chart showing a frame shooting operation to be performed also in the EF mode in a case where the exposure time is shorter than the shutter closing time Tc. FIG. 6 is a timing chart showing a field shooting operation to be performed not in the EF mode with the exposure time set to be shorter than the shutter closing time Tc. FIG. 7 is a timing chart showing a frame shooting operation to be performed not in the EF mode with the exposure time set to be shorter than the shutter closing time Tc.

Figure 15:
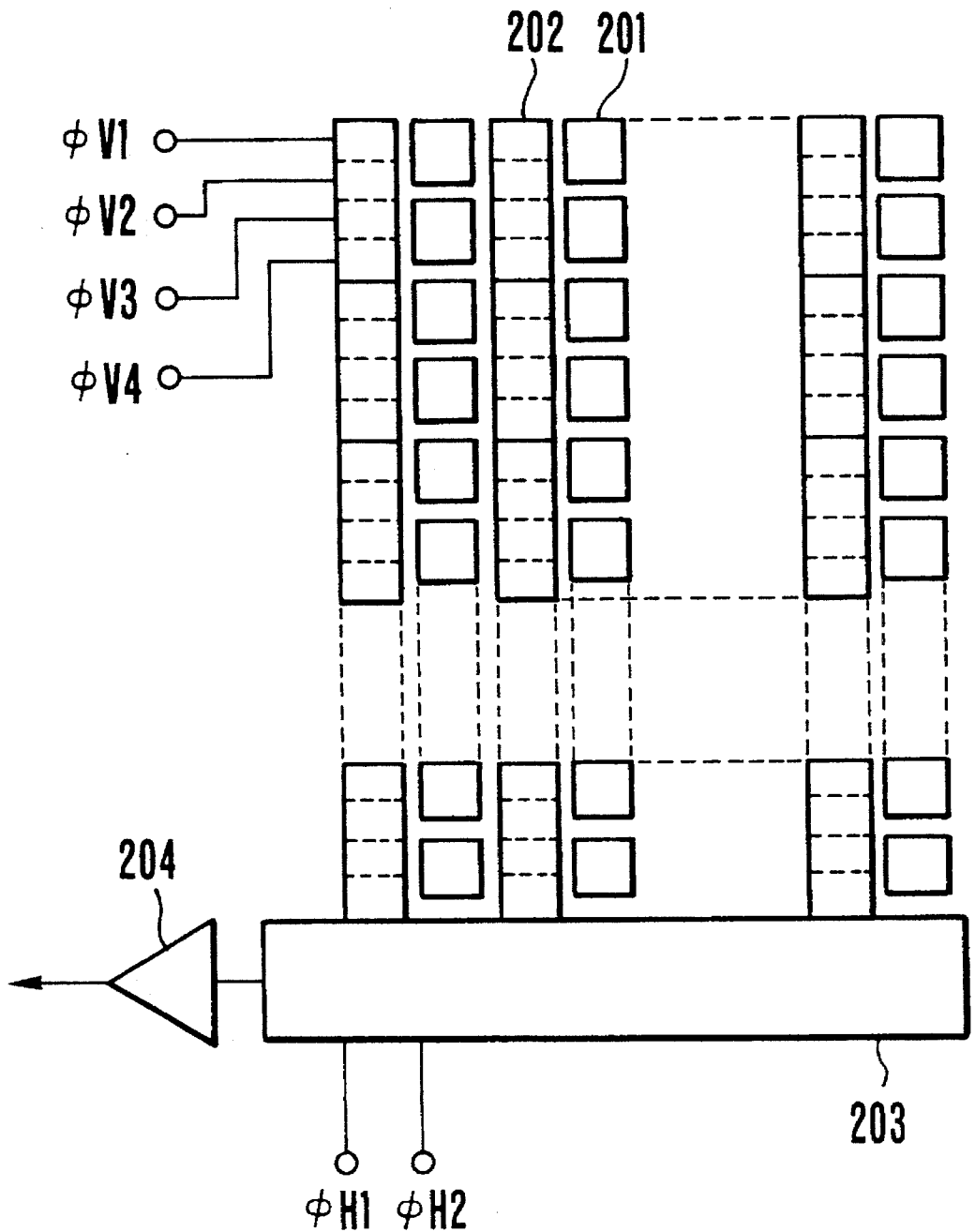
FIG. 15 shows the arrangement of an image sensor used for the first embodiment of this invention.

Further, FIG. 15 shows by way of example the arrangement of the image sensor. In the case of FIG. 15, an inter-line type CCD is employed. Referring to FIG. 15, the image sensor includes photo-electric conversion elements 201 and vertical CCDs 202 (vertical transfer registers) which are arranged to transfer electric charge accumulated in the photo-electric conversion elements 201. The vertical CCDs 202 are driven by applying transfer pulses of four phases øV1 to øV4 thereto respectively from first to fourth vertical transfer electrodes.

The odd-number columns of the photo-electric conversion elements 201 are connected to a first vertical transfer electrode and the even-number columns of them to the third vertical transfer electrode, respectively. The first and third vertical transfer electrodes are arranged to serve also as gates for transferring the electric charge of the photo-electric conversion elements 201 to vertical transfer shift registers. A horizontal CCD (a horizontal transfer shift register) 203 is provided with first and second horizontal electrodes, which are arranged to be driven by applying two-phase pulses øH1 and øH2. An output circuit 204 includes an emitter follower.

The inter-line type CCD is arranged to permit the electric charge of the photo-electric conversion elements 201 to be cleared by applying a voltage to a substrate by which the sensor (CCD) is formed in such a way as to sweep out the electric charge to the substrate.

Referring to the flow charts of FIGS. 8 and 9(*a*), 9(*b*), an external interrupt is allowed to take place within the system controller 10 by turning on a switch SW1 which is arranged to be turned on by a first stroke of a release button (not shown). A sequence of control processes for the image pickup action is initiated by the external interrupt. At a step S1, a check is first made for confirmation of the fact that the interrupt is not caused by any spurious signal such as a noise. After the confirmation, a sensitivity value SV which is necessary for calculation of an exposure value is set by steps S2 to S6 according to the shooting (image pickup) mode selected. At the step S2, a check is made for the shooting mode. If the mode is found to be not the frame shooting mode, the flow of operation comes to the step S3. At the step S3, a frame flag which shows the frame shooting mode is reset. At the step S4, the sensitivity value SV is set at a given value k (such as ISO 100) for the field shooting mode. If the mode is found to be the frame shooting mode at the step S2, the flow comes to the step S5. At the step S5, the frame flag is set. At the step S6, the sensitivity value SV is set, for the frame shooting mode, at a value which is lower by one step than the sensitivity value for the field shooting mode. The sensitivity value for the frame shooting mode is set, for example, at a value k−1, wherein "−1" indicates that the value is lowered by one step. The value k−1 is thus ISO 50 if the sensitivity value for the field shooting mode is ISO 100. At a next step S7, the output of the light measuring element 11 is subjected to a logarithmic compression process carried out at the luminance information processing circuit 12 by setting the circuit 12 into a light measuring mode. After that, the logarithmically compressed output of the light measuring element 11 is digitized. Digital data thus obtained is taken into the system controller 10. At a step S8, a check is made for the EF mode in which the flash device is to be used for shooting. In the event of the EF mode, the flow comes to a step S13 for the operation shown in FIG. 4. At the step S13, an EF flag is set. At a step S14, the flash device is charged. At a step S15, an aperture value and a shutter speed are set. At a step S16, a check is made to find if the flash device charging action has been completed. If not, the flow comes back to the step S1 to repeat the actions described above. In that case, the flow does not come to a step S17 for making a check for the on- or off-state of a switch SW2 which is not shown but is arranged to be turned on by a second stroke of the release button.

If the flash device charging action is found to have been completed at the step S16, the flow comes to the step S17. At the step S17, the switch SW2 is checked for its on- or off-state. If the switch SW2 is found not in the on-state, the flow comes back to the step S1.

Further, if the result of the check made for the EF mode at the step S8 is negative, the flow comes to a step S9. At the step S9, the EF flag is reset. At a step S10, the charging action on the flash device is brought to a stop. At a step S11, the color temperature of light illuminating the object is measured. At a step S12, an aperture value and a shutter speed are calculated from the luminance of the object measured at the step S7 and the sensitivity of the image sensor set at the step S4 or S6. After that, the flow comes to the step S17 to make a check for the state of the switch SW2.

With the above-stated loop of steps S1 to S17 executed, when the on-state of the switch SW2 is detected at the step S17, the flow comes to steps S18 and S19. At the steps S18 and S19, as apparent from FIG. 4, the power is supplied to the control magnet 104 and the shutter blade opening motor 102 at a time point t1 to set the shutter blades 110 and 111 at an aperture value position corresponding to the object luminance measured. At the step S19, the motor is caused to normally rotate. Then, against the urging force which is exerted in the direction of closing, the shutter blades 110 and 111 come to open the aperture. Accordingly as the opening action progresses, the moving pulse generating means which consists of the photo-interrupter 109 and the pulse gear 108 interlocked with the shutter blades 110 and 111 or the shutter blade driving member 107 outputs a signal 302 relative to the movement of the shutter blades as shown in FIG. 4. This signal is supplied to the system controller 10.

At a step S20, the system controller 10 detects the aperture of the shutter blades 110 and 111 by counting the pulses of the pulse signal. At a step S21, the number of pulses counted is checked to find if it corresponds to an aperture value calculated beforehand at a time point t2. If so, the flow comes to a step S22. At the step S22, the motor 102 is caused to reversely rotate.

As apparent from FIGS. 2, 3(a), 3(b) and 3(c), the magnet lever 105 is pushed against the control magnet 104 by the protruding part 103c of the charge member 103 before the shutter opening action. Since the control magnet 104 has already been energized by then as shown in FIG. 4, the magnet lever 105 is kept in its position in the state of being sucked by the control magnet 104 even when the charge member 103 comes back to its position as shown in FIG. 3(c) as a result of the reverse rotation of the motor 2 caused at the step S22. At a step S23, a check is made to find if the charge member 103 has returned to its position shown in FIG. 3(a). If so, the flow comes to a step S46. At the step S46, the reverse rotation of the motor 102 is brought to a stop. At this time, since the shutter blades 110 and 111 are being urged to move in the direction of closing, they try to close the aperture by moving together with the shutter blade driving member 107. However, the shutter blade driving member 107 is locked by the shutter blade lock member 106, so that the aperture can be kept at a desired aperture value position.

After the aperture of the iris is accurately set in the manner described above, the flow comes to a step S64. At the step S64, a check is made to find if the shutter speed, i.e., the exposure time, calculated at the step S12 or S15 is larger or smaller than a length of time required after the start of the movement of the shutter blades 110 and 111 until the aperture part 112a is closed (hereinafter referred to as the time Tc) with the power supply to the control magnet 104 cut off at a time point t4. This check is, however, may not be made, depending on whether the apparatus is in the EF mode or not, in the fill-in flash mode (the object luminance obtained without flashing the flash device is larger than a given value) or not, and in the frame shooting mode or in the field shooting mode. Therefore, before making the check at the step S64 to find if the exposure time is larger than the time Tc, the flow comes to steps S61, S62 and S63. At the step S61, a check is made for the frame shooting mode or the feild shooting mode. At the step S62, a check is made for the EF mode. At the step S63, a check is made for the fill-in flash mode. The flow comes to the step S64 to make the check or comparison between the exposure time and the time Tc only when the results of the checks made at the steps S61, S62 and S63 are as shown below (1) The frame shooting mode.

(2) A natural light shooting mode (non-EF mode) and the field shooting mode.

(3) The EF mode, the fill-in flash mode and the field shooting mode.

In the other case, that is, in the field shooting mode and the EF mode and not in the fill-in flash mode, no comparison between the exposure time and the time Tc is made and the flow comes to a step S24. At the step S24, all electric charge existing within the image sensor 3, including electric charge generated by heat and photoelectrons caused by the incident optical image of the object during a period of time after the start of opening movement of the shutter blades and before an aperture is set is removed by means of an electric charge sweep-out pulse øES.

Further, in cases where the check or comparison between the exposure time and the time Tc is made at the step S64 with the results (1), (2) and (3) obtained from the preceding checks, if the exposure time is found to be longer than the time Tc, the electric charge existing within the image sensor 3 as described above is also removed by means of the electric charge sweep-out pulse øES at the step S24. In these cases (where the apparatus is in the field shooting mode and the EF mode and not in the fill-in flash mode, or where the exposure time is longer than the time Tc with the results (1), (2) and (3) obtained), an exposure is immediately allowed to commence for picking up the image of the object.

The processes after the step S24 vary according to whether or not the operation is to be performed in the EF mode which requires flashing of the flash device. The following describes, with reference to FIGS. 16 to 19, various image pickup modes to be carried out in cases where the exposure time is longer than the time Tc.

The flow of operation to be performed in the EF mode when the exposure time is longer than the time Tc is first described as follows: At a step S25, a check is made for the EF mode. To make it consistent with the check made at the step S7 before commencement of the exposure action, the check is made through the EF flag. If the EF flag is set indicating the EF mode, the flow comes to a step S28. At the step S28, an accumulating time limit timer is set to limit the accumulation time when the amount of exposure is insufficient even with the flash device fully flashed. At a step S29, the luminance information processing circuit 12 is set in an integrating operation mode. At a step S30, the integrator is reset to clear any signal obtained therein up to that time. At a step S31, a trigger signal 305 for causing the flash device to flash is sent out to the flash light control circuit 14. In response to this signal, the flash light control circuit 14 causes the flash device 13 to begin to flash as shown at a part 306 in FIG. 16. Flash light which is reflected by the object as a result of flashing is photo-electrically converted by the light measuring element 11 into an electrical signal which corresponds to the quantity of incident light. The electrical signal is integrated by the luminance information processing circuit 12. The circuit 12 compares the output of the light measuring element 11 which has been integrated from the beginning of flashing with a predetermined value which has been set at such a value as to give an apposite exposure. When the integrated value comes to exceed the preset value at a time point t6, the luminance information processing circuit 12 outputs a signal for stopping the flash device 13 from flashing. The signal is supplied to the flash light control circuit 14 and the system controller 10.

The generation of the flashing stop signal indicates that the exposure has been correctly made. Upon detection of this signal at a step S32, therefore, the system controller 10 performs exposure terminating and image information reading processes. These processes also vary according to the frame shooting mode or the field shooting mode. However, the processes in the field shooting mode are described below with reference to FIG. 16:

At a step S34, a check is made for a frame flag which is set in the event of the frame shooting mode. If the mode is thus found to be the field shooting mode, the flow comes to a step S47 to make a check for the EF flag. If the flag is set for the EF mode in the field shooting mode, the exposure by the electronic shutter is terminated in the following manner.

Figure 16:
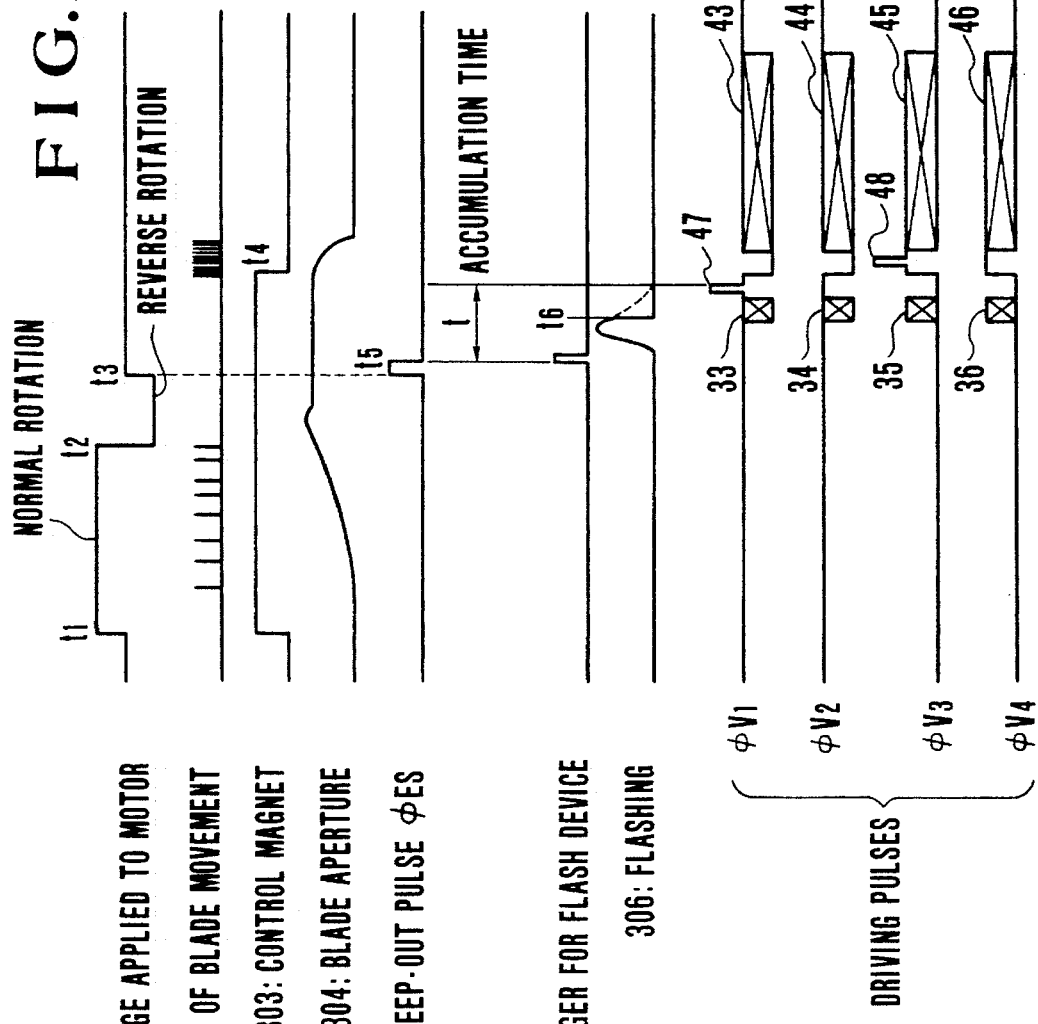
FIG. 16 is a timing chart showing a field shooting operation performed in the EF mode when the exposure time is longer than the time Tc.

The flow of operation comes to a step S35. At the step S35, a high-speed clearing action is first performed to remove any unnecessary electric charge leaking into the light-shielded vertical transfer route of the image sensor by means of pulses 33 to 36 which are as shown in FIG. 16. At a step S36, the SSG 8 is instructed to perform a field reading action. At a step S37, the power supply to the control magnet 104 is cut off at a point of time t4. The reading action is carried out as follows. After completion of the sweep-out action performed on the unnecessary electric charge leaking into the vertical transfer shift register by means of the sweep-out pulse øES, a first reading pulse 47 is applied to the first vertical transfer electrode. Following this, a second reading pulse 48 is applied to the third vertical transfer electrode. By this action, the electric charge which is moved by the first reading pulse 47 to the vertical transfer shift register and is transferred to the third vertical transfer electrode is added to the electric charge which is moved by the second reading pulse 48 to the vertical transfer shift register. In other words, in the vertical direction, the electric charges of two photo-electric conversion elements 201 are added together at a time. After that, the electric charge is vertically transferred by the vertical transfer pulses 43 to 46. The vertically transferred electric charge is read out line by line by the horizontal transfer shift register 203. The so-called field reading is thus accomplished.

With respect to the shutter, since the lever 105 is urged to move counterclockwise by the spring 105c, the lever 105 swings counterclockwise when the control magnet 104 is deenergized at the point of time t4. The lever 105 thus causes the shutter blade lock member 106 to turn clockwise against the force of the spring 106c. As a result, the shutter blade driving member 107 is unlocked and comes to drive the shutter blades 110 and 111 to move in the direction of closing the shutter. With the shutter blades moved in this manner, a shutter blade movement detection signal 302 is formed.

The shutter blade closing action and the field reading action on the image signal are thus performed in parallel with each other. However, in effect, the control over the exposure terminating time is controlled by the image signal reading action caused by the sweep-out pulse øES of FIG. 16 (particularly by the action of transferring the electric charge from the photo-electric converting picture elements to the electric charge accumulating part which is shielded from light). In other words, the accumulation time t of the image sensor is arranged to be determined by the pulses 47 and 48 which cause the electric charge to be moved from the photo-electric converting part to the vertical transfer shift register, beginning at a point of time t5 at which the sweeping out action by the sweep-out pulse øES comes to an end. The time difference between these pulses 47 and 48 is a length of time of only several sec. which is negligible in respect of the exposure time.

At steps S38 and S39, checks are made for the end of the shutter closing action and that of the reading action. After completion of these actions, the flow comes to a step S45. At the step S45, the switch SW2 is checked for its state to avoid performing the image pickup action twice or more for one release operation. If the switch SW2 is thus found in an off-state, the flow comes back to the step S1 of FIG. 8 to repeat the processes described, beginning with the check for the state of the switch SW1.

Figure 17:
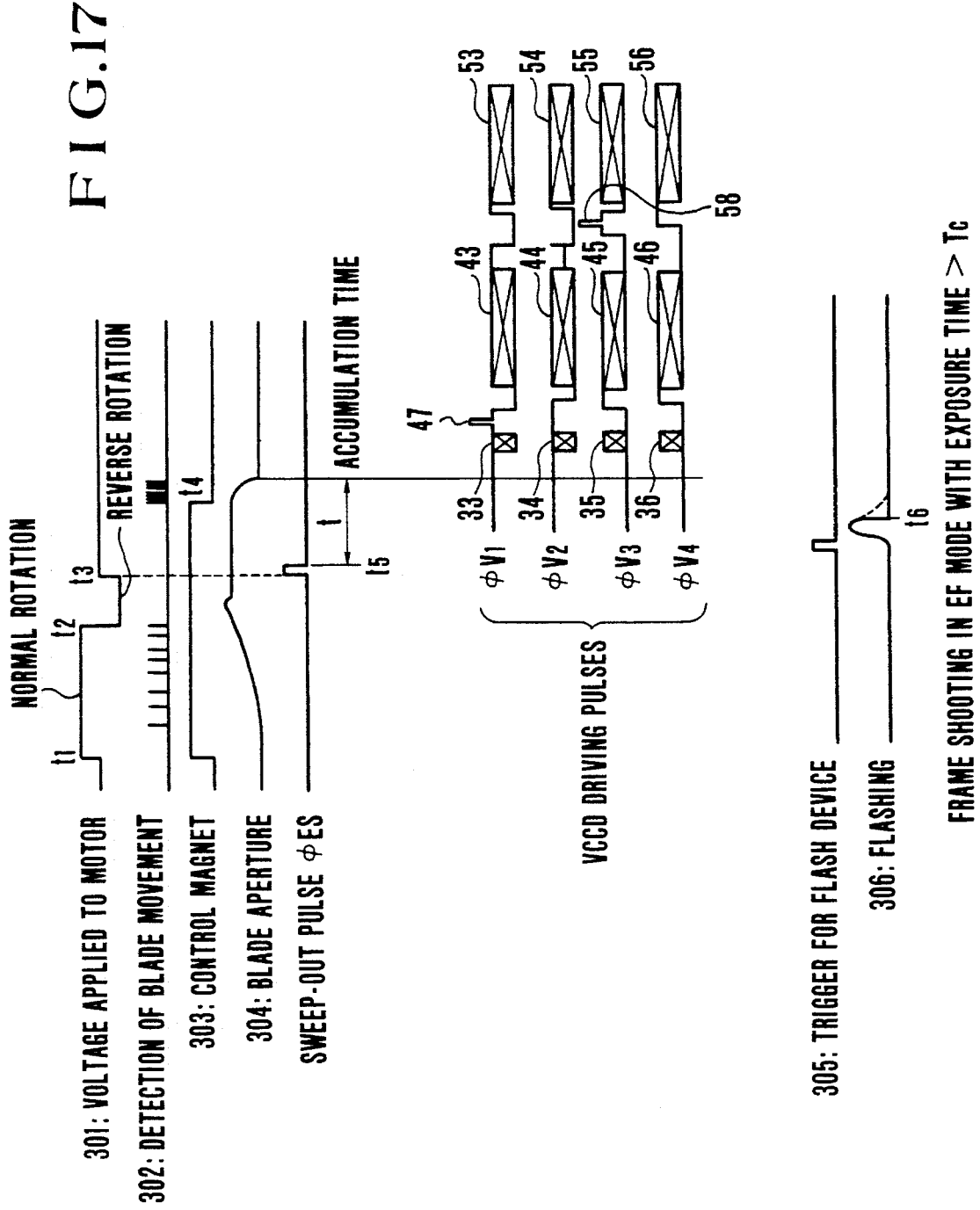
FIG. 17 is a timing chart showing a frame shooting operation performed in the EF mode when the exposure time is longer than the time Tc.

FIG. 17 is a timing chart showing a frame shooting operation to be performed in the EF mode which requires the use of the flash device. The following description covers only the parts of FIG. 17 which differ from FIG. 16. Like the field reading mode shown in FIG. 16, the flow of operation comes to the step S34 after completion of the accumulating action or after detection of full flashing of the flash device. At the step S34, a check is made for a discrimination between the frame shooting mode and the field shooting mode. In the case of the frame shooting mode, the flow comes to a step S40. At the step S40, unlike the field shooting mode, the power supply to the control magnet 104 is cut off at the time point t4 to close the shutter 1. At a step S41, a check is made for confirming the closed state of the shutter 1. This check may be replaced with a process of waiting for the lapse of a given period of time without performing the confirming action. At a next step S42, unnecessary electric charge existing within the vertical transfer route is removed by carrying out a high-speed transfer action with the vertical high-speed transfer pulses 33 to 36. At a step S43, the SSG 8 is instructed to perform a frame reading action, which is performed as follows. The electric charge obtained at the photo-electric conversion elements 201 is moved to the vertical transfer shift register 202 by applying the first reading pulse 47 to the first vertical transfer electrode øV1. After that, the electric charge is caused to be transferred by means of vertical transfer pulses 43 to 46 to the lowest horizontal transfer shift register 203 to be read out line by line. By this process, the electric charge which exists in the odd-number lines on the image pickup plane of the image sensor is read out.

Following the above-stated process, the electric charge on the photo-electric conversion elements 201 is moved onto the vertical transfer shift register 202 by applying the second reading pulse 58 to the third vertical transfer electrode øV3. After that, the electric charge is caused to be transferred by vertical transfer pulses 53 to 56 to the lowest horizontal transfer shift register 203 to be read out line by line there. By that process, the electric charge existing in the even-number lines on the image pickup plane of the image sensor is read out.

With the frame reading action performed in the above-stated manner, the flow comes to a step S44. At the step S44, a check is made for completion of the frame reading action. Steps after the step S44 are executed in the same manner as in the field shooting mode and are, therefore, omitted from the following description.

FIG. 19 is a timing chart showing an exposure time forming (defining) action in a frame shooting operation to be performed in a non-EF mode in which no flashing by the flash device is required. The frame shooting operation in the non-EF mode differs from the frame shooting operation in the EF mode in the following point. Again referring to the flow charts of FIGS. 8 and 9(a), 9(b), after the mode is found to be not the EF mode, the flow of operation comes to a step S26. At the step S26, the exposure time calculated at the step S12 is set on a timer. At a step S27, the flow waits for the end of the time counting action of the timer. Upon completion of the action of the timer, an exposure terminating process is performed.

Figure 18:
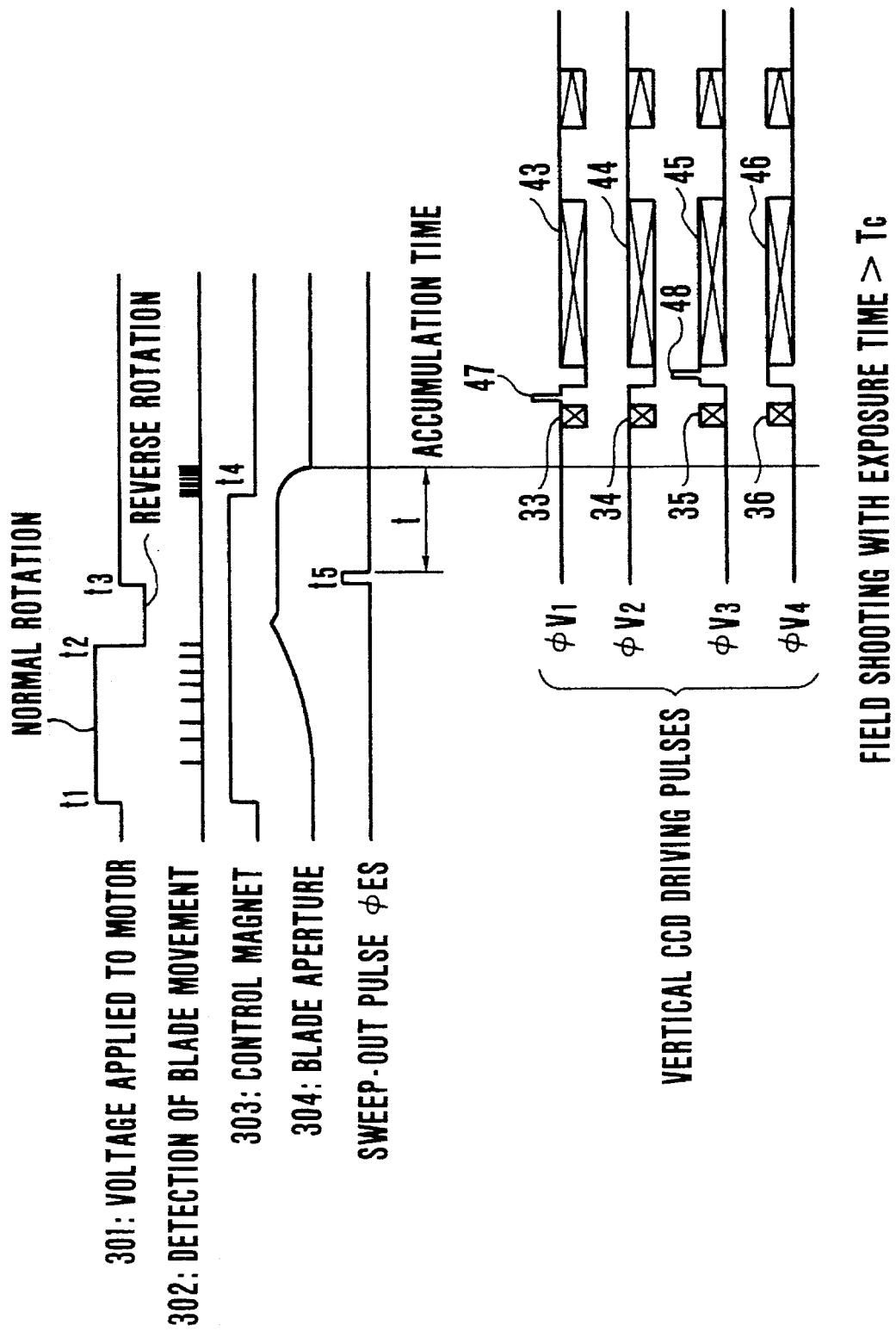
FIG. 18 is a timing chart showing a field shooting operation performed in a non-EF mode when the exposure time is longer than the time Tc.

The exposure time defining action in a field shooting operation to be performed in the non-EF mode as shown in FIG. 18 is similar to the frame shooting operation of FIG. 19. In the case of this embodiment, the operation in the non-EF mode differs, however, from the field shooting operation of FIG. 16 which is performed in the EF mode in the following point. In the exposure terminating process, an exposure by the mechanical shutter is brought to an end when the mode is found to be not the EF mode at the step S47.

The following describes a reason for changing the shutter from the electronic shutter over to the mechanical shutter and vice versa according to whether the field shooting operation is to be performed in the EF mode or in the non-EF mode as described above.

Generally, any smear that takes place during the process of reading can be more effectively suppressed by carrying out the reading action after covering the image sensor 3 with the shutter shown in FIGS. 2 and 3(a) to 3(c) as in the case of the frame shooting operation shown in FIG. 19. In cases where use of a flash device is necessary, however, the object image is dark in general while the flash device is not flashed. Therefore, no smear likely occurs for an object image obtained during the process of flashing. The operation mentioned above thus brings about no problems relative to the smear.

Further, in the event of the fill-in flash mode, the problem of smear may arise as the object luminance is relatively high while the flash device is not flashing. In that event, with respect to a given length of time required between commencement of a shift from an object image accumulating state to a non-accumulating state and completion of the shift, a length of time required by the optical light-shielding means between the start and the end of its light-shielding action is longer than a length of time required for the transfer of the electric charge from the photo-electric converting picture elements to the light-shielded electric charge accumulating part. Therefore, if an exposure is terminated by the optical light-shielding means, the amount of accumulation caused by background light after completion of flashing by the flash device becomes not negligible. Then, if the background has a high luminance, an over-exposure tends to result from the shooting operation. The amount of overage of exposure relates to the length of exposure time remaining after the end of flashing by the flash device. Therefore, even if a smear takes place, the image can be obtained in a better quality with the exposure time virtually terminated by transferring the electric charge from photo-electric converting picture elements to the light-shielded electric charge accumulating part. Further, it goes without saying that a difference in effective accumulation time due to a difference in acting time between the two different exposure terminating actions is corrected beforehand by means of action mode flags (the EF flag and the frame flag) at the time of computation of the aperture and the shutter speed at the step S12.

The processes of the steps S25 to S39, S44 and S52 are executed in the manner as described above. These processes are described also in U.S. patent application Ser. No. 767,512 cited in the foregoing.

A feature of this invention resides in a high-speed shutter operation to be performed in a case where the exposure time is shorter than the time Tc. The high-speed shutter operation is performed as described below.

Coming back to the step S64, the exposure time is compared with the time Tc in the case of the condition (1), (2) or (3) as mentioned in the foregoing. If the exposure time is found to be shorter than the time Tc, the flow of operation comes to a step S65. At the step S65, the power supply to the control magnet 104 is first turned off. The shutter blades 110 and 111 are caused to make a closing movement. At a step S66, the flow waits for the lapse of a length of time obtained by subtracting the actual exposure time from the shutter blade closing time Tc. At a step S67, a check is made for the EF flag. If the EF flag is not set (in the event of a non-EF mode), the flow comes to a step S72. At the step S72, the SSG 8 is instructed to form the electric charge sweep-out pulse. At a step S73, the flow waits for completion of closing of the shutter 1.

If the EF flag is found to have been set to indicate the EF mode at the step S67, the flow comes to a step S68. At the step S68, the luminance information processing circuit 12 is set in its integration mode. At a step S69, the SSG 8 is instructed to form the electric charge sweep-out pulse. At a step S70, the integrator disposed within the luminance information processing circuit 12 is reset. At a step S71, which corresponds to the timing 305 indicated in FIG. 4, the flash device is triggered. After that, the flow comes to a step S73 to wait for completion of closing of the shutter 1 in the same manner as in the case of the non-EF mode. After the shutter 1 is closed, the flow comes to a step S74. At the step S74, an instruction is given for high-speed transfer of unnecessary electric charge existing within the vertical transfer route of the image sensor 3. At a step S75, a check is made for a discrimination between the frame shooting mode and the field shooting mode. The flow comes to the step S43 or S51 according to the result of the check. At the step S43 or S51, an instruction is given for reading in the associated shooting mode. At the step S44 or S52, the flow waits for completion of reading. After completion of reading, the flow comes to the step S45 to make a check for the on- or off-state of the switch SW2.

After the step S45, the flow comes back to the step S1 to repeat the steps described in the foregoing. In the procedures of the steps S65 to S75 described with reference to FIGS. 9(a) and 9(b), the length of time between cutting-off of the power supply to the control magnet 104 and the formation of the electric charge sweep-out pulse is obtained by subtracting the exposure time from the time Tc (the traveling time of the shutter 1) at the step S66. However, the invention is not limited to this arrangement.

Figure 10:
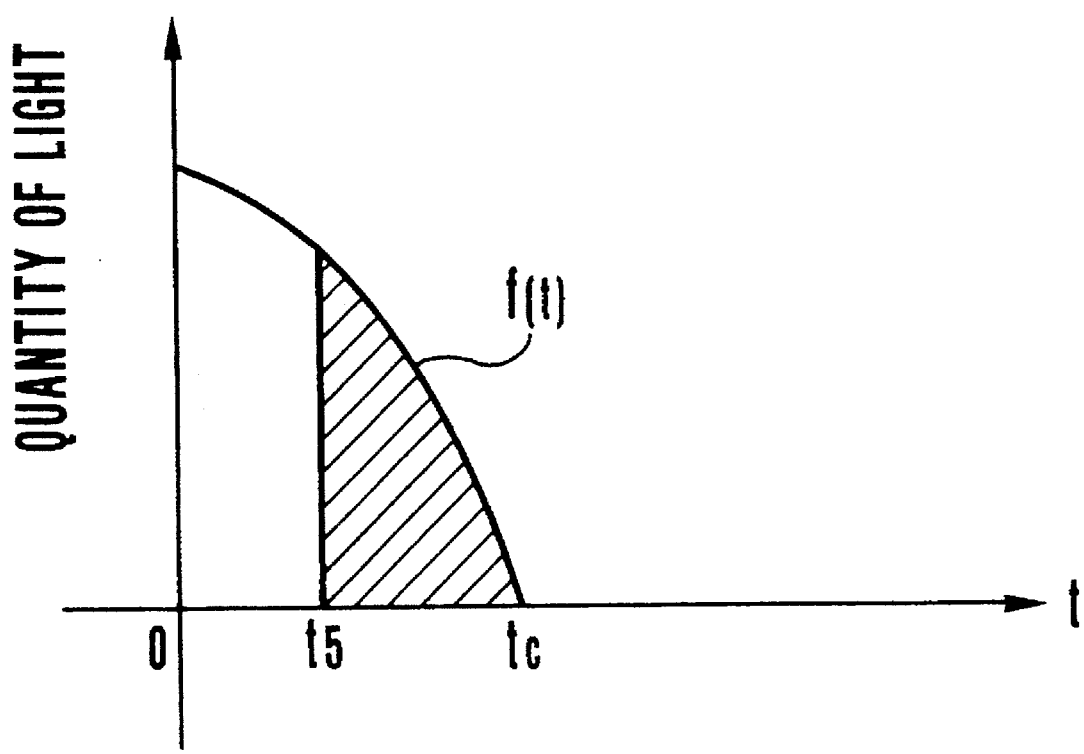
FIG. 10 shows the amount of exposure effected during the closing action of mechanical light-shielding means of the image pickup apparatus of this invention.

FIG. 10 is a graph showing the amount of exposure. Time t is shown on the abscissa axis and the quantity of light on the ordinate axis, with the shutter action start point of time (time point t4 at which the power supply to the control magnet 104 is cut off in this embodiment as shown in FIGS. 4 to 7) assumed to be t=0. Assuming that the instantaneous value of quantity of light incident on the image sensor 3 is f(t), an amount of exposure S obtained between the point of time t5 at which the electric charge of the image sensor 3 is swept out and another point of time tc at which the shutter 1 is closed can be expressed as follows:

$$S = \int_{T5}^{tc} f(t)dt$$

Therefore, the exposure amount may be obtained by any method of calculation as long as the point of time t5 where the exposure amount S becomes adequate is obtained from the sensitivity of the image sensor and the light value measured before commencement of the exposure.

Further, the completion of closing of the shutter may be detected either by counting the pulses of or measuring the time interval of the signal which relates to the movement of the blades and is formed by the pulse gear and the photo-interrupter (108 and 109) or by measuring a length of time elapsing from the start of the action (the point of time t4).

FIG. 5 is a timing chart showing a frame shooting operation in the EF mode requiring use of the flash device. In this case, a high-speed shutter operation is necessary for an exposure time shorter than the time Tc required for closing the shutter 1. The flash device is used, for example, in the fill-in flash mode.

FIG. 6 is a timing chart showing a field shooting operation performed without using the flash device. A high-speed shutter operation is necessary for an exposure time shorter than the shutter closing time Tc. This operation applies to a case where the luminance of the object is very high.

FIG. 7 is a timing chart showing a frame shooting operation performed without using the flash device. A high-speed shutter operation is necessary for an exposure time shorter than the shutter closing time Tc. That operation applies also to a case where the luminance of the object is very high.

Figure 11:
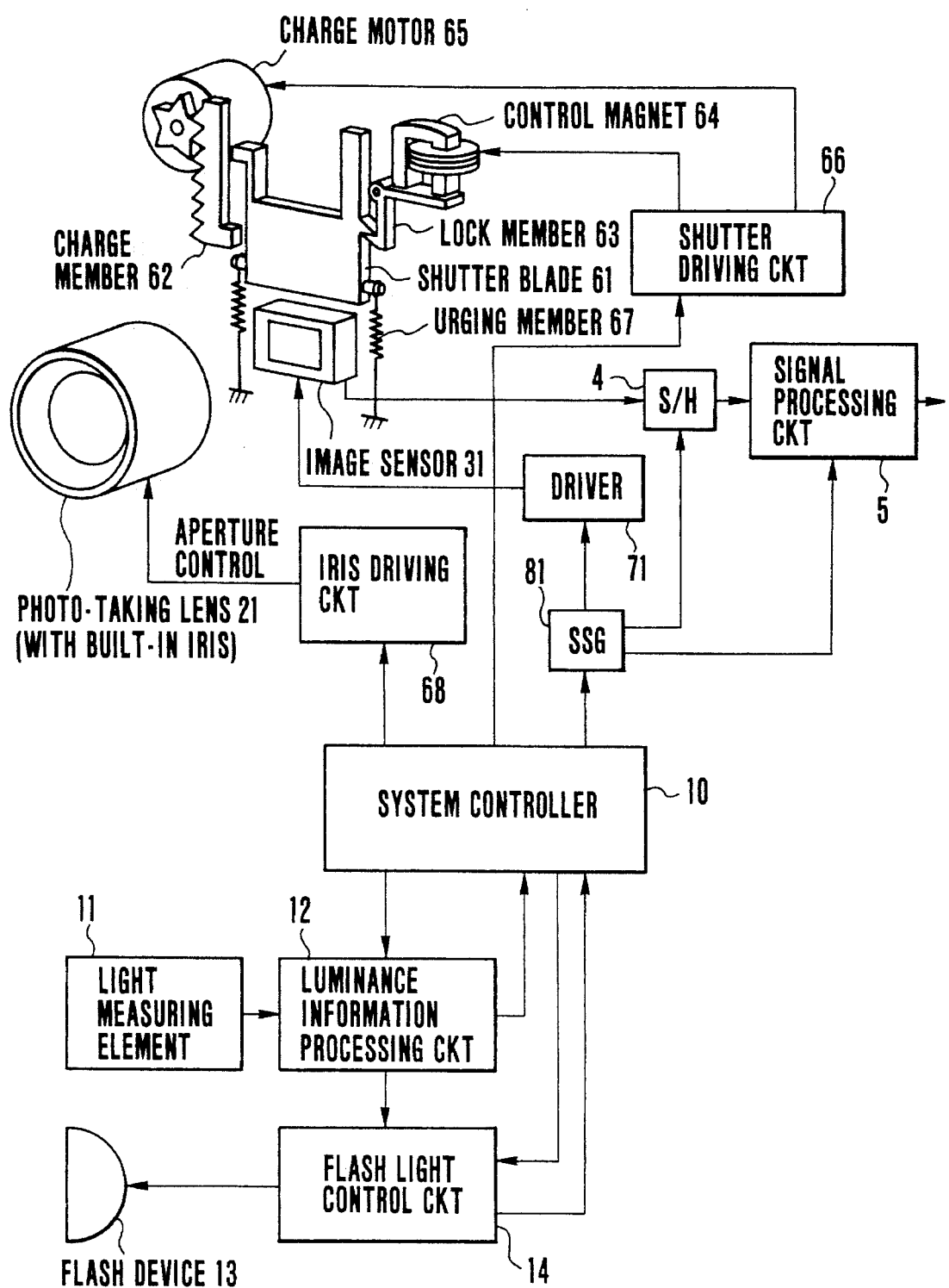
FIG. 11 is a block diagram showing a second embodiment of this invention.

FIG. 11 shows a second embodiment of this invention. The second embodiment differs from the first embodiment in the following points. The instantaneous value of the exposure amount is arranged to be controlled by means of a photo-taking lens 21 having an iris, instead of the iris shutter which is arranged to serve as an iris as well as as a shutter as shown in FIGS. 1 to 3(c). The exposure time is arranged to be terminated by a focal plane shutter which consists of parts 61 to 67. Unlike the inter-line type CCD as shown in FIG. 15, an image sensor 31 of the second embodiment is of a type arranged to be capable of removing unnecessary electric charge line by line for scanning lines, such as an MOS type image sensor. The description of the operation of this image sensor given herein is limited to its necessary portion only. The operation of the sensor of this type is described in detail in U.S. patent application Ser. No. 788,287, filed on Nov. 5, 1991.

The second embodiment differs from the first embodiment shown in FIGS. 1 to 3(c) also in the system component elements 61 to 67 used for operating an iris driving circuit 68 and the focal plane shutter. In FIG. 11, all the component elements having the same functions as those of FIG. 1 are indicated by the same reference numerals and the details of them are omitted from the following description.

Referring to FIG. 11, a charge member 62 is arranged to charge shutter blades 61 toward an open position against the force of an urging member 67. A lock member 63 is urged to move clockwise by an urging member (not shown) and is arranged to lock the shutter blades 61 in the open position. A control magnet 64 is arranged to release the lock member 63 from its locking action. A charge motor 65 is arranged to drive the charge member 62. A driving circuit 66 is arranged to operate the focal plane shutter by driving the charge motor 65 and the control magnet 64. The urging member 67 is arranged to urge the shutter blades 61 to move in the direction of closing the shutter. An iris driving circuit 68 is arranged to drive the iris disposed within a photo-taking lens 21. A synchronizing signal generator (SSG) 81 is arranged to generate a synchronizing clock signal which is necessary for the actions of the image sensor 31, the sample-and-hold (S/H) circuit 4 and the signal processing circuit 5. A driving circuit (or driver) 71 is arranged to drive the image sensor 31 in response to the output of the SSG 81.

Figure 12:
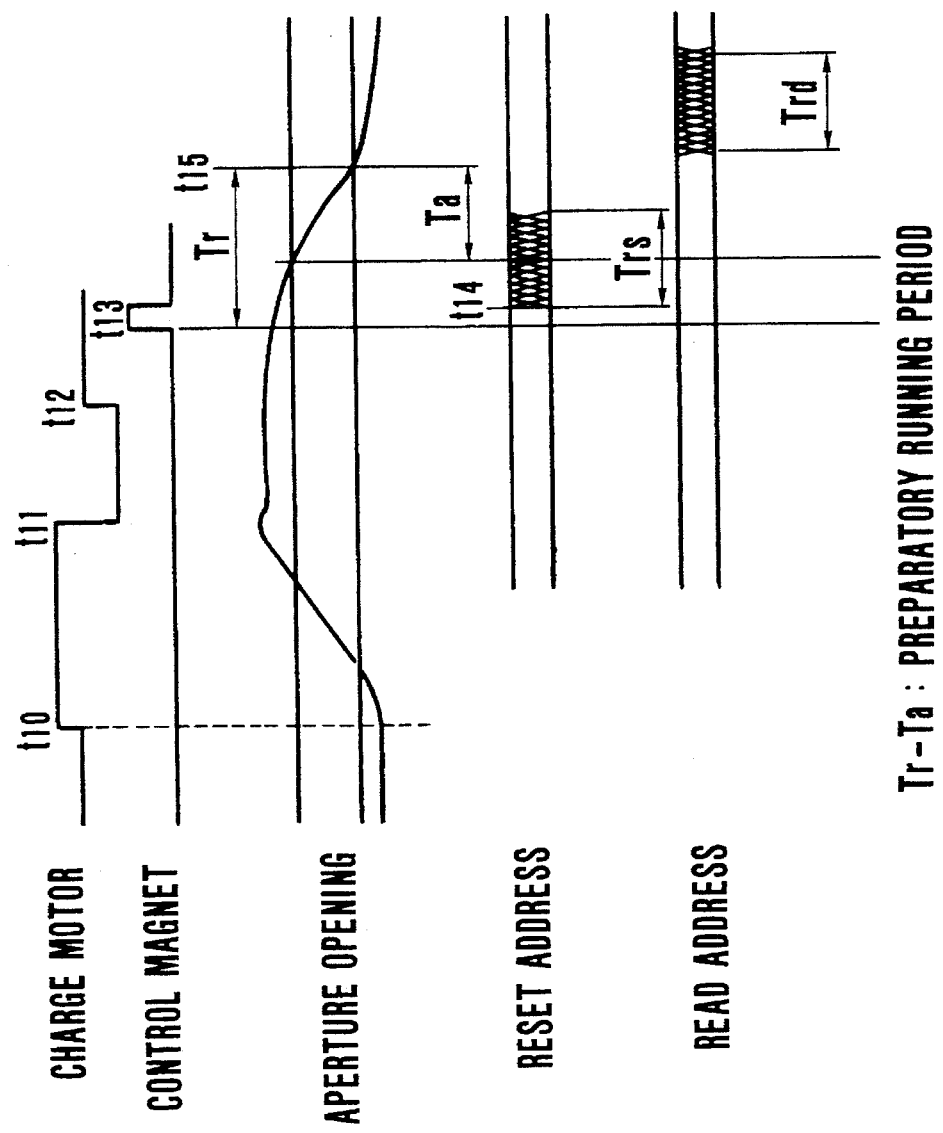
FIG. 12 is a timing chart showing the operation of the second embodiment of this invention.
Figures 13, 13A:
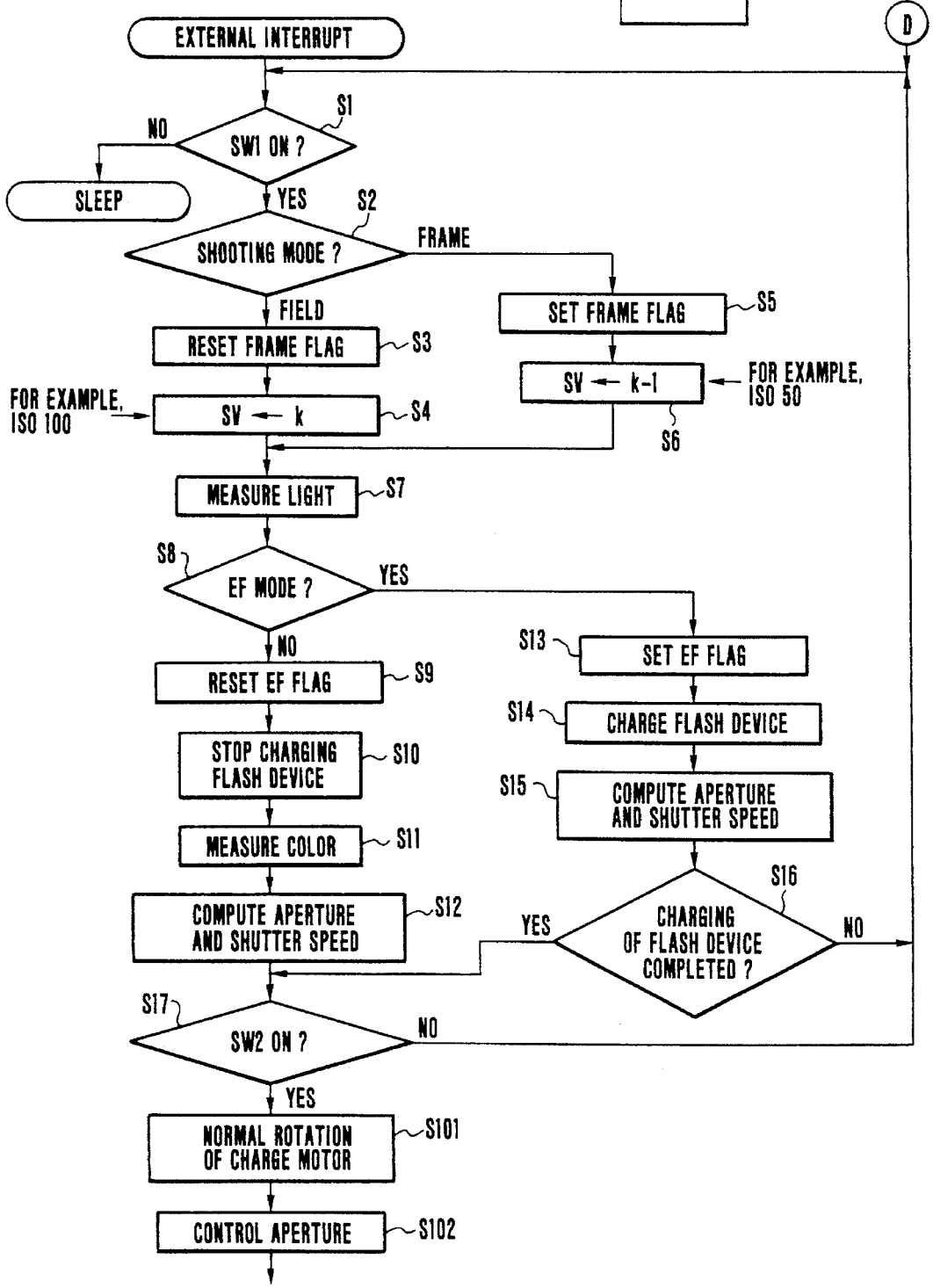
FIGS. 13(a) and 13(b), assembled as shown in FIG. 13, are flow charts showing the operation of the second embodiment of this invention.
Figure 13B:
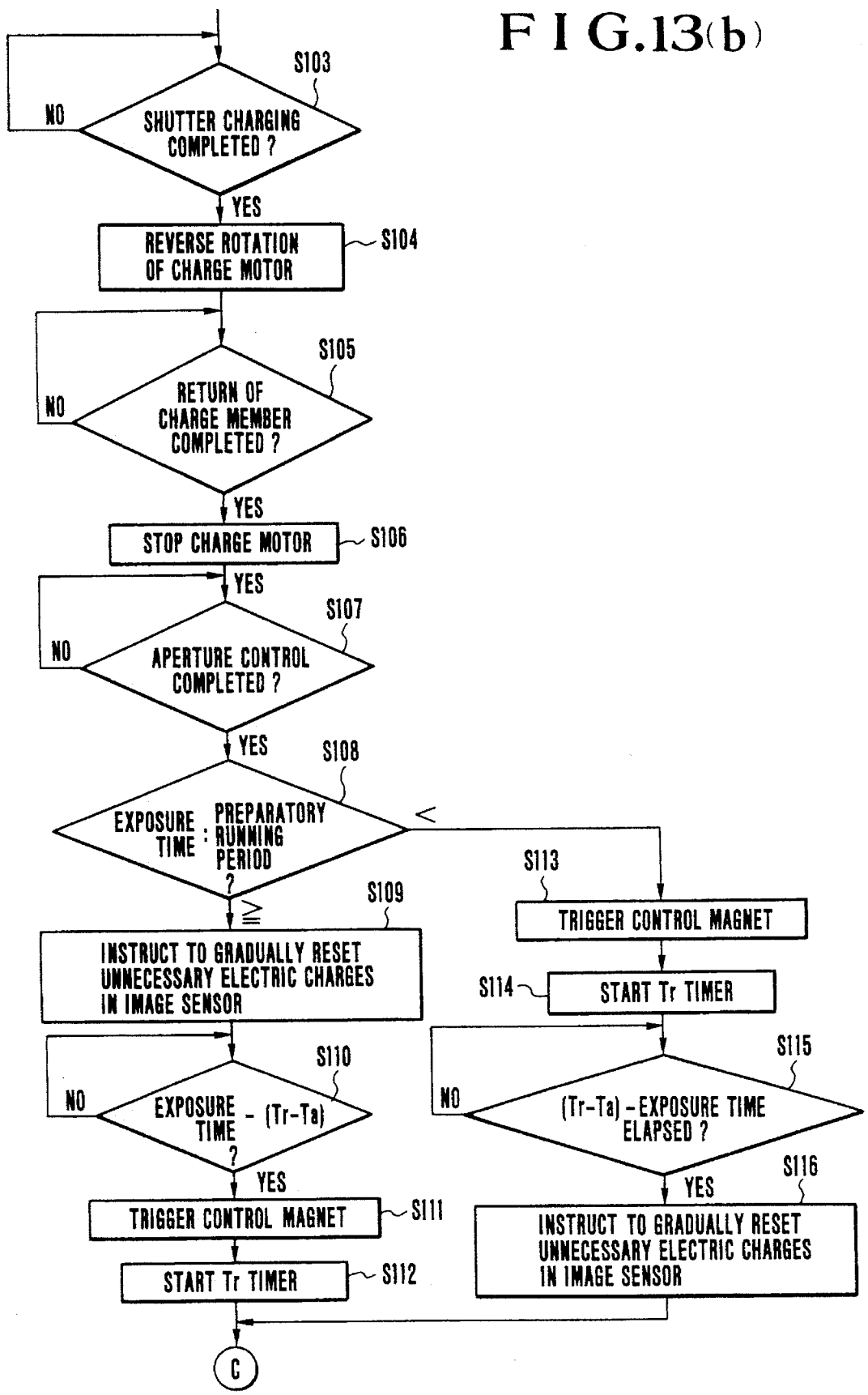
Figure 14:
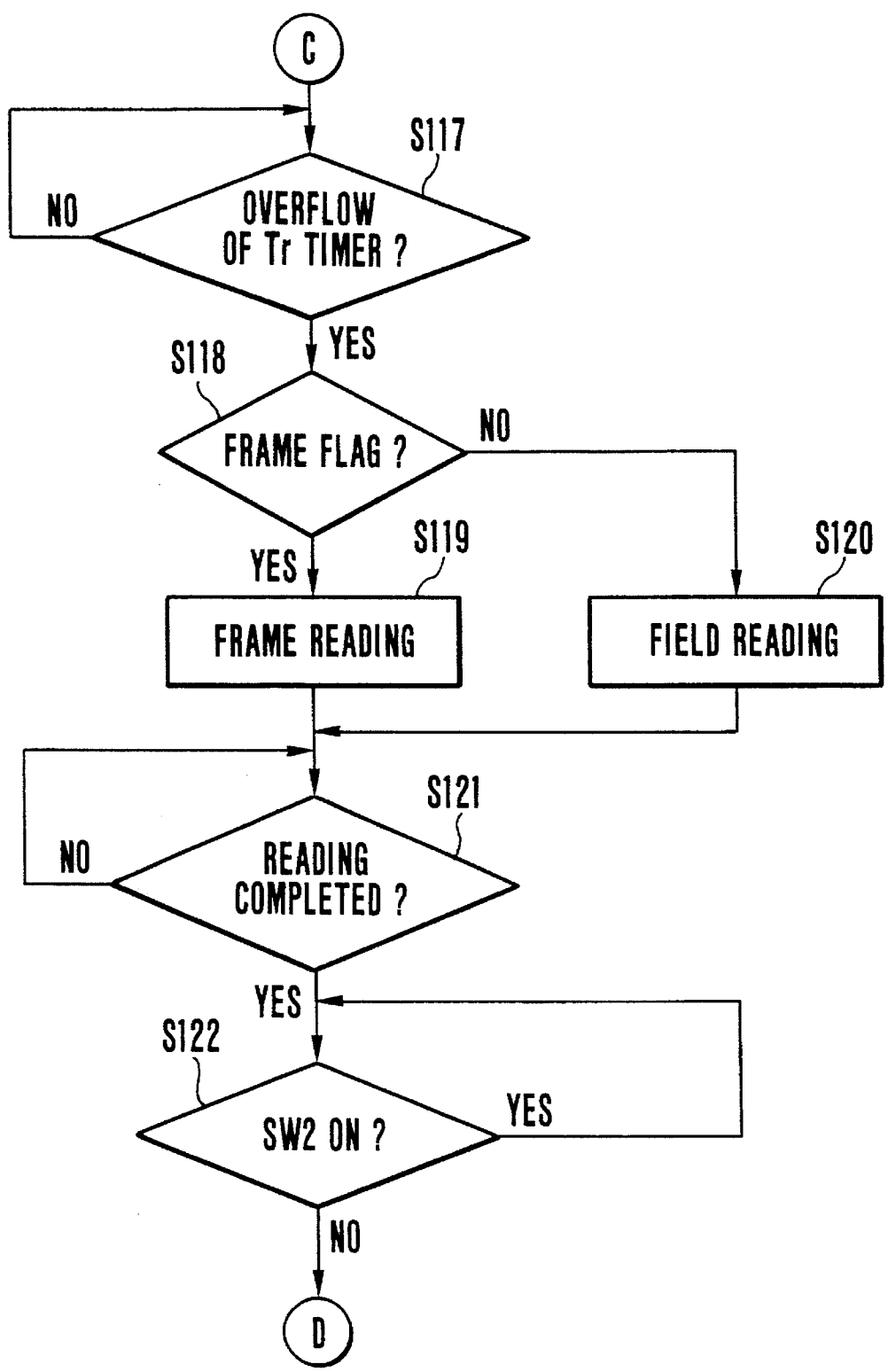
FIG. 14 is a flow chart showing the operation of the second embodiment of this invention.

The operation of the image pickup apparatus which is arranged as described above is described below with reference to FIG. 12 which is a timing chart and to FIGS. 13(a), 13(b) and 14 which are flow charts:

When the switch SW1 which is arranged to be closed by a first stroke of a release button (not shown) is turned on at a step S1, various processes are carried out, including a check made for a shooting mode, setting sensitivity, light measurement, a check for a flash mode, calculation of an aperture value and a shutter speed, etc.

These processes and the flow of operation up to the step of detecting the on-state of the switch SW2 which is arranged to be turned on by a second stroke of the release button are exactly the same as the steps S1 to S17 of the first embodiment. These processes are, therefore, omitted from the following description.

When the on-state of the switch SW2 is detected, the flow of operation comes to a step S101. At the step S101, the shutter driving circuit 66 is first instructed to move the shutter blades 61 via the charge member 62 to a state of being not shielded from light by applying a current to the charge motor 65. This step corresponds to a point of time t10 shown in the timing chart of FIG. 12. At a next step S102, the iris driving circuit 68 is instructed to set the iris disposed within the photo-taking lens 21 at an aperture position corresponding to an aperture value calculated by the step S12 or S15. At a step S103, a check is made to find if a shutter charging process has been completed (and the shutter blades 61 are locked by the lock member 63). If so, the flow comes to a step S104 which corresponds to a point of time t11 of FIG. 12. At the step S104, the charge motor 65 is caused to reversely rotate. At a step S105, a check is made to find if the charge member 62 has returned to its initial position. If so, the flow comes to a step S106, which corresponds to a point of time t12 of FIG. 12. At the step S106, the rotation of the motor 65 is stopped.

Upon completion of the step S106, the flow comes to a step S107 to make a check to find if the control over the iris aperture has been completed. If not, the flow waits for completion of the aperture control.

After completion of the shutter charging (opening) process and that of the aperture control, the flow comes to a step S108. At the step S108, the exposure time calculated at the step S12 or S15 is compared with a preparatory running period, which is a length of time obtained by subtracting a period of time Ta from a period of time Tr, i.e., "Tr–Ta", as shown in FIG. 12.

If the exposure time is found to be longer than the preparatory running period, a normal exposure time setting method is employed. In that instance, the flow comes to a step S109. At the step S109, the SSG 81 is first instructed to gradually reset the image sensor 31. At a step S110, the SSG 81 serially sends out reset address signals via the driver 71 to the image sensor 31. The picture elements of the image sensor 31 are then cleared one after another from an upper part to a lower part. At a step S110, the flow waits for the lapse of a length of time obtained by subtracting the preparatory running period from the exposure time. At a step S111, the control magnet 64 is triggered. At a step S112, a Tr timer which is arranged to count the traveling time Tr of the shutter blades 61 (a period of time from the start of the travel of the shutter blades until the aperture is completely closed) is caused to begin its count. Then, the flow comes to a step S117.

At the step S117, the flow waits for the end of the count of the Tr timer. Upon completion the count, i.e., the travel of the shutter blades, the flow comes to a step S118. At the step S118, a check is made for the shooting mode. The flow comes to a step S120 or to a step S119 according to the associated shooting mode. At the step S120, a field reading action is performed. At the step S119, a frame reading action is performed. At a step S121, a check is made to find if the reading action has been completed. If so, the flow comes to a step S122. At the step S122, a check is made for the on- or off-state of the switch SW2. This check is made for the purpose of preventing the object image from being picked up twice or more for one release operation in the same manner as the step S45 of the first embodiment.

One round of the shooting operation comes to an end at the step S122. The flow then comes back to the step S1 to make the check for the state of the switch SW1.

When the exposure time calculated at the step S12 or S15 is compared with the preparatory running period at the step S108, if the exposure time is found to be shorter than the preparatory running period, the second embodiment operates in the following manner, which is a feature of this invention. The term "preparatory running period" as used herein means a period between commencement of the travel of the shutter blades 61 caused by the urging member 67 after a release of them from their locked position deviating from an image pickup aperture and their arrival at a point where they begin to actually shield the aperture from light. This period is provided for the purpose of stabilizing the travel of the shutter blades and also for preventing them from covering a part of the aperture in their locked position. With the exposure time found to be shorter than the preparatory running period, the flow of operation comes to a step S113, which corresponds to a point of time t13 shown in FIG. 12. At the step S113, the shutter blades 61 are unlocked by triggering the control magnet 64.

At a step S114, the timer is started to count the traveling time of the shutter blades 61. At a step S115, the flow waits for a length of time obtained by subtracting the exposure time from the preparatory running period. After that, the flow comes to a step S116, which corresponds to a point of time t14 shown in FIG. 12. At a step S116, the SSG 81 is instructed to begin to gradually perform the resetting action on the image sensor 31.

The SSG 81 then sends out reset address signals to the image sensor 31, like in the case of the step S109. By this, the picture elements of the image sensor 31 are reset from an upper part to a lower part at the same speed as the traveling speed of the shutter blades 61, so that effective exposure time of one scanning line can be equalized with that of another. If the whole image pickup plane is reset at the same time, the period of time Ta which is necessary for the travel of the shutter blades would cause an uneven exposure. Whereas, the above-stated resetting action effectively prevents such unevenness of exposure.

Therefore, in gradually resetting the picture elements in the same direction as the traveling direction of the shutter blades, it is necessary to arrange the period of time required for resetting the whole image plane to be equal to the period of time required by the shutter blades for traversing the aperture (the period of time Ta of FIG. 12).

After the instruction is given at the step S116 for the gradual resetting action described above, the flow comes to a step S117 to wait for the end of the count of the shutter travel time counting timer. After that, the flow comes to steps S118 to S120 to execute the reading action according to the shooting operation mode selected.

In the case of the field shooting operation mode, the flow comes to the step S120 to instruct the SSG 81 to perform a field reading action on the image sensor 31. The field reading is performed as shown in the timing chart of FIG. 12. The instruction is given at a point of time t15 shown in FIG. 12.

The SSG 81 then serially outputs and sends reading address signals via the driver 71 to the image sensor 31. In accordance with this output of the SSG 81, data of the picture elements of the image sensor 31 is read out and supplied to the S/H circuit 4 and the signal processing circuit 5. The signal processing circuit 5 then performs various processes for recording, etc. At the step S121, a check is made for completion of the reading and signal processing actions. At the step S122, the flow waits for turning-off of the switch SW2. With the switch SW2 turned off, one shooting operation comes to an end.

In the case of this embodiment, the flow of operation is arranged to wait for the lapse of the traveling time of the shutter blades by using the Tr timer for detecting the time of completion of the light-shielding action on the aperture part of the shutter. This arrangement of course may be changed to arrange some means for detecting completion of the movement of the shutter blades and to have the flow of operation wait for the output of this detecting means.

What is claimed is:

1. An image pickup apparatus comprising:
   (a) image pickup means for producing an electrical signal based on an optical image;
   (b) shutter means for shielding said image pickup means from said optical image; and
   (c) control means for controlling and causing said image pickup means to start producing the electrical signal after controlling and causing said shutter means to start shielding said image pickup means.

2. An image pickup apparatus according to claim 1, wherein said shutter means includes a mechanical member.

3. An image pickup apparatus according to claim 1, wherein said control means controls and causes said image pickup means to start producing the electrical signal by resetting said image pickup means.

4. An image pickup apparatus according to claim 3, wherein said control means resets said image pickup means by supplying a reset signal to clear an electrical signal accumulated in said image pickup means.

5. An image pickup apparatus comprising:
   (a) image pickup means for producing an electrical signal based on an optical image;
   (b) shutter means for shielding said image pickup means from said optical image; and
   (c) control means for resetting said image pickup means after starting shielding said image pickup means by operating said shutter means.

6. An image pickup apparatus according to claim 5, wherein said control means controls and causes said image pickup means to start producing the electrical signal by resetting said image pickup means.

7. An image pickup apparatus according to claim 5, wherein said control means resets said image pickup means by supplying a reset signal to clear an electrical signal accumulated in said image pickup means.

8. An image pickup apparatus according to claim 5, wherein said image pickup means includes a charge coupled device.

9. An image pickup apparatus according to claim 1, wherein said shutter means includes an iris shutter.

10. An image pickup apparatus according to claim 5, wherein said control means resets said image pickup means by removing the electrical signal accumulated in said image pickup means.

11. An image pickup apparatus according to claim 5, further comprising flash means for illuminating an object to be picked up.

12. An image pickup apparatus according to claim 11, wherein said control means triggers said flash means after resetting said image pickup means.

13. An image pickup apparatus according to claim 12, wherein said flash means includes light metering means for detecting the amount of light reflected by said object.

\* \* \* \* \*